United States Patent
Morrison et al.

(10) Patent No.: US 9,851,749 B2
(45) Date of Patent: Dec. 26, 2017

(54) MAGNETIC HINGE SYSTEM

(71) Applicant: Dell Products L.P., Round Rock, TX (US)

(72) Inventors: Jason Scott Morrison, Cedar Park, TX (US); David Michael Meyers, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/133,057

(22) Filed: Apr. 19, 2016

(65) Prior Publication Data

US 2017/0300084 A1  Oct. 19, 2017

(51) Int. Cl.
  *G06F 1/16* (2006.01)
(52) U.S. Cl.
  CPC .......... *G06F 1/1616* (2013.01); *G06F 1/1637* (2013.01); *G06F 1/1681* (2013.01)
(58) Field of Classification Search
  CPC combination set(s) only.
  See application file for complete search history.

(56) References Cited

U.S. PATENT DOCUMENTS

| 6,253,826 B1 * | 7/2001 | Witter | E06B 3/481 160/213 |
| 7,089,627 B2 * | 8/2006 | Seidler | B65D 51/04 16/320 |
| 7,467,440 B2 * | 12/2008 | Seidler | B65D 51/04 16/320 |
| 8,125,759 B2 * | 2/2012 | Fukuma | F16G 13/18 248/349.1 |
| 8,988,876 B2 * | 3/2015 | Corbin | A45C 13/002 361/679.58 |
| 8,995,117 B1 * | 3/2015 | Hayashida | G06F 1/1616 361/679.26 |
| 9,047,055 B2 * | 6/2015 | Song | E05D 3/14 |
| 9,121,207 B2 * | 9/2015 | Stuart | E05D 5/0246 |
| 2007/0157432 A1 * | 7/2007 | Weinstein | E05D 11/00 16/320 |
| 2014/0345086 A1 * | 11/2014 | Heth | E05D 11/1014 16/320 |

FOREIGN PATENT DOCUMENTS

CN  102587759 A  *  7/2012

* cited by examiner

*Primary Examiner* — Lisa Lea Edmonds
(74) *Attorney, Agent, or Firm* — Haynes and Boone, LLP

(57) ABSTRACT

A magnetic hinge system includes a first member and a second member moveably coupled together by a hinge. The hinge includes a flexible base connected to each of the first member and the second member, and a plurality of magnetic elements extending from the flexible base. The magnetic elements are configured to be moved into first relative positions that result in the magnetic forces between the magnetic elements holding the magnetic elements in a first stable orientation to provide the first member and the second member in a first configuration. The magnetic elements are also configured to be moved into second relative positions that result in the magnetic forces between the magnetic elements holding the magnetic elements in a second stable orientation to provide the first member and the second member in a second configuration that is different than the first configuration.

20 Claims, 26 Drawing Sheets

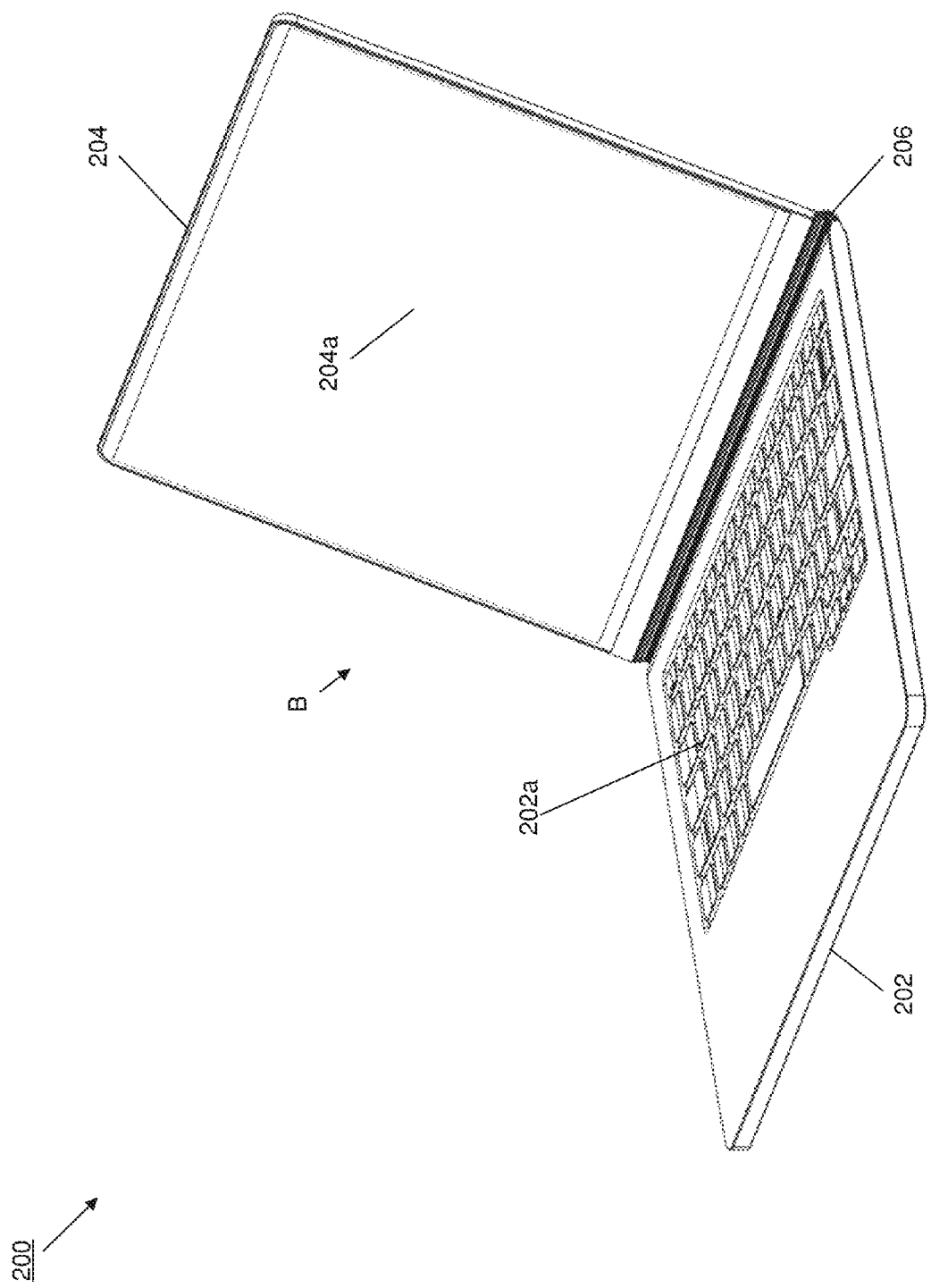

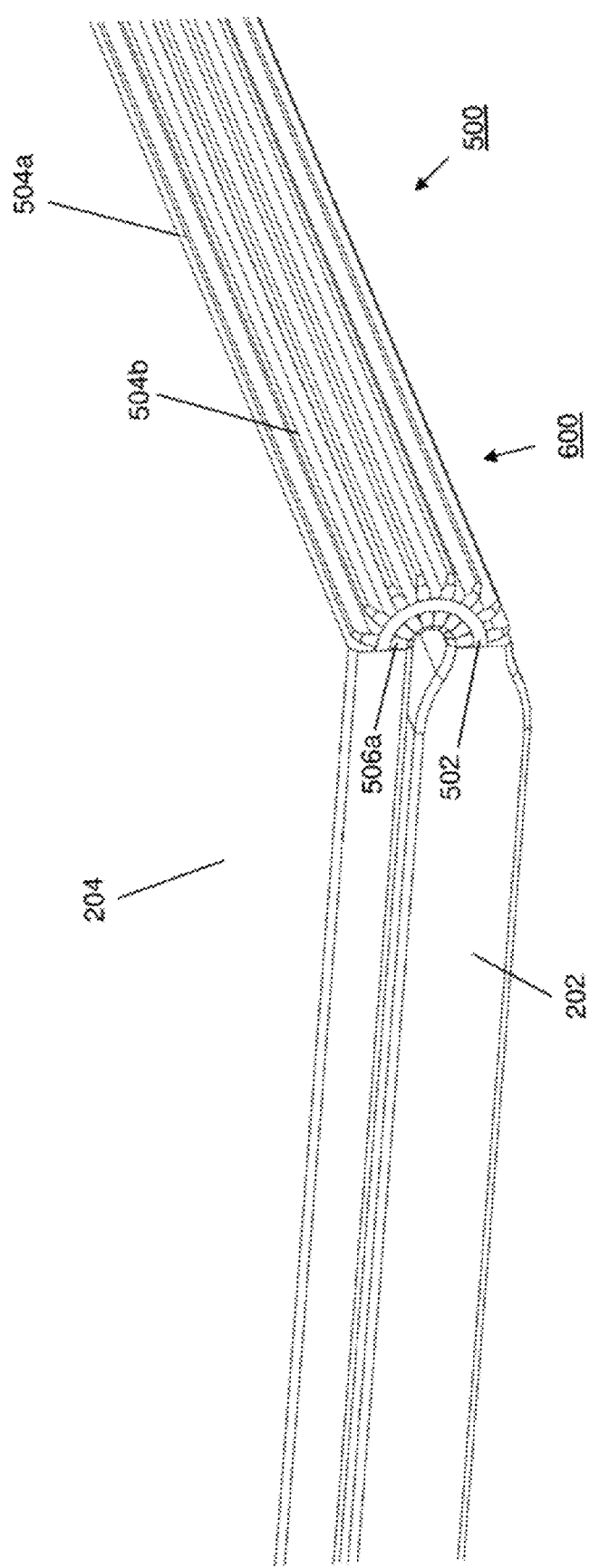

MAGNETIC HINGE SYSTEM

BACKGROUND

The present disclosure relates generally to information handling systems, and more particularly to a magnetic hinge system for use with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, laptop/notebook computing devices, convertible laptop/tablet computing devices, mobile phones, and/or other computing devices known in the art, include a plurality of chassis members that are moveable into multiple orientations to provide for a variety of configurations of the computing device. For example, convertible laptop/tablet computing devices include a base member that is moveably coupled to a display member by a hinge system that allows the display member to move relative to the base member to provide the convertible laptop/tablet computing device in a closed configuration (e.g., with the display member located immediately adjacent the base member and the display screen facing the base member), a laptop configuration (e.g., with the display screen oriented at an angle of approximately 90-135 degrees relative to the base member), and a tablet configuration (e.g., with the display member located immediately adjacent the base member and the display screen facing a direction opposite the base member). However, conventional hinge systems provided on such computing devices are subject to a number of issues, as those hinge systems are friction-based hinge systems that utilize only mechanically engaging elements and the friction between them to allow for each of the different configurations of the computing device. As such, such conventional hinge systems are subject to wear that can reduce their ability to provide the different configurations of the computing devices, and in some case failure that requires the hinge system (or the computing device itself) to be replaced Accordingly, it would be desirable to provide an improved hinge system.

SUMMARY

According to one embodiment, an information handling system (IHS) includes a base member housing a processing system and a memory system; a display member housing a display device; and a hinge moveably coupling the base member to the display member, wherein the hinge includes: a flexible base connected to each of the base member and the display member; and a plurality of magnetic elements extending from the flexible base; wherein the plurality of magnetic elements are configured to be moved into first relative positions that result in the magnetic forces between the plurality of magnetic elements holding the plurality of magnetic elements in a first stable orientation to provide the base member and the display member in a first configuration; and wherein the plurality of magnetic elements are configured to be moved into second relative positions that result in the magnetic forces between the plurality of magnetic elements holding the plurality of magnetic elements in a second stable orientation to provide the base member and the display member in a second configuration that is different than the first configuration.

BRIEF DESCRIPTION OF THE DRAWINGS

FIG. 2B is a perspective view illustrating an embodiment of the computing device of FIG. 2A in a second configuration.

FIG. 6A is a perspective view illustrating an embodiment of a convertible laptop/tablet computing system in a first orientation using the magnetic hinge system of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
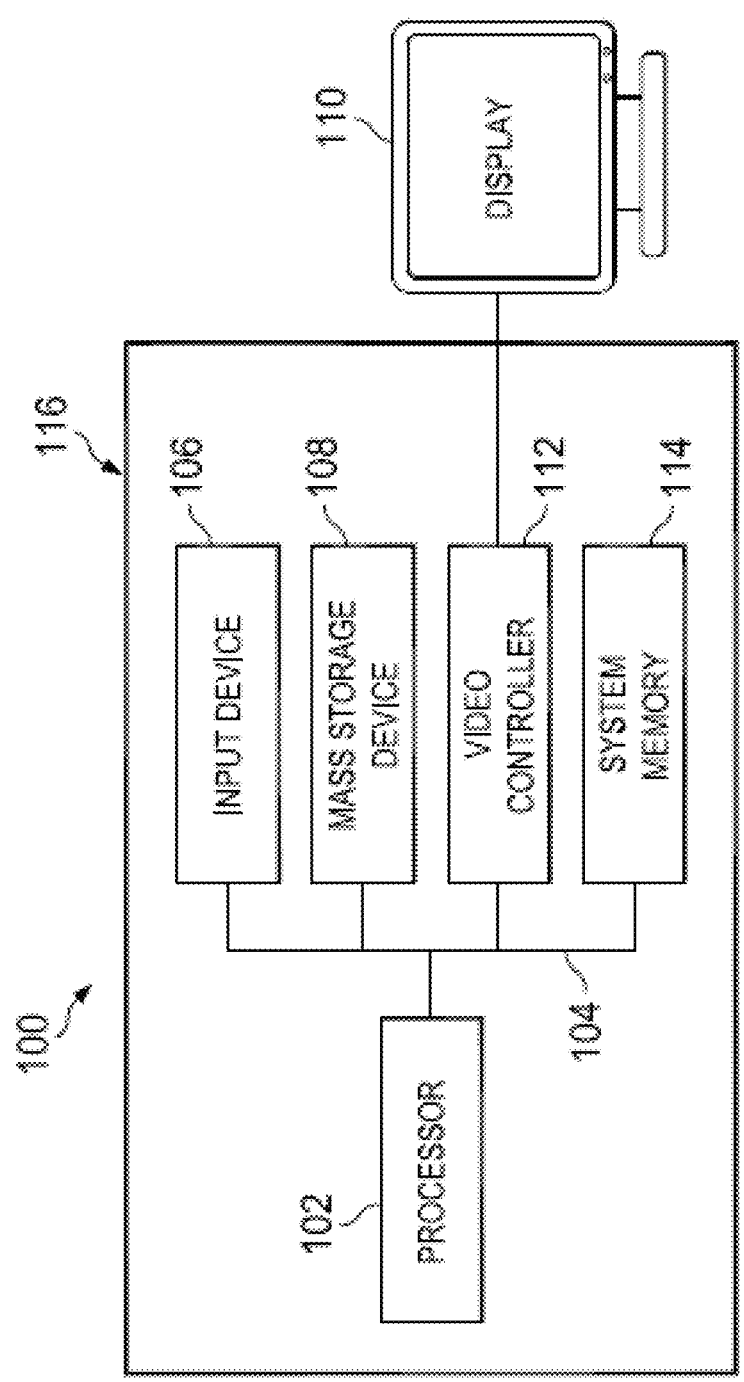
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
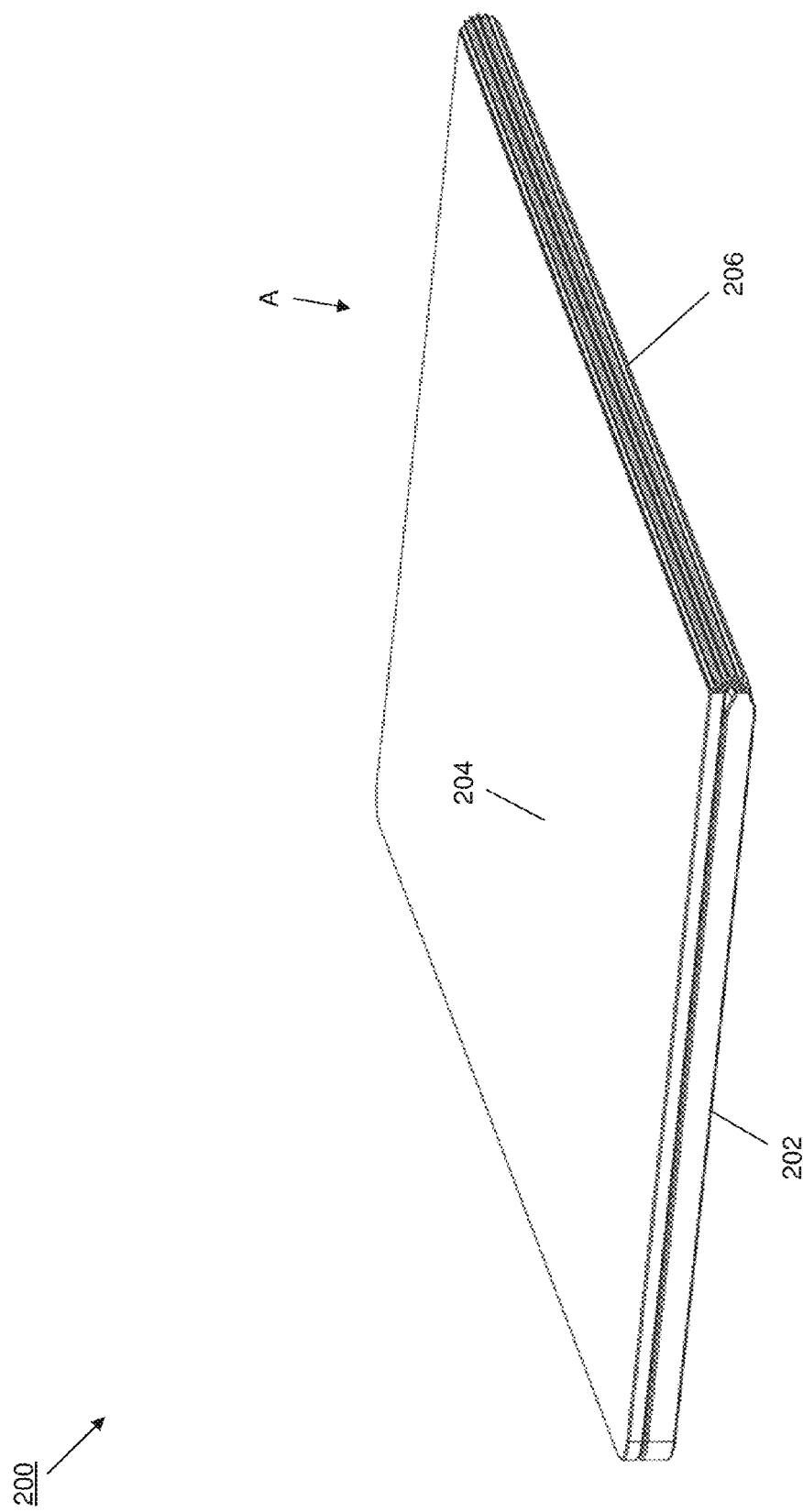
FIG. 2A is a perspective view illustrating an embodiment of a computing device in a first configuration.

Referring now to FIGS. 2A and 2B, an embodiment of a computing device 200 is illustrated that utilizes the magnetic hinge system of the present disclosure. However, systems other than computing systems are envisioned as benefitting from use of the magnetic hinge system of the present disclosure, and thus those systems are envisioned as falling within the scope of the present disclosure as well. In the illustrated embodiment, the computing device 200 is provided by a convertible laptop/tablet computing device (discussed in further detail below) that includes a base member 202 that may house a processing system (not illustrated, but which may include the processor 102 discussed above with reference to FIG. 1), a memory system (not illustrated, but which may include the memory 114 discussed above with reference to FIG. 1), and/or any of the other components of the IHS 100 discussed above with reference to FIG. 1, including the input device(s) 202a that may be provided by the input device 106 discussed above with reference to FIG. 1. The computing device 200 also includes a display member 204 that houses a display device 204a that may be the display 110 discussed above with reference to FIG. 1. The base member 202 and the display member 204 are moveably coupled together by a magnetic hinge system 206 that may be provided by any of the teachings (or combinations thereof) discussed below. As discussed below, the magnetic hinge system 206 may provide for a plurality of different configurations of the base member 202 and the display member 206, including the closed configuration A that is illustrated in FIG. 2A, and the laptop/notebook configuration B illustrated in FIG. 2B.

Figure 3:
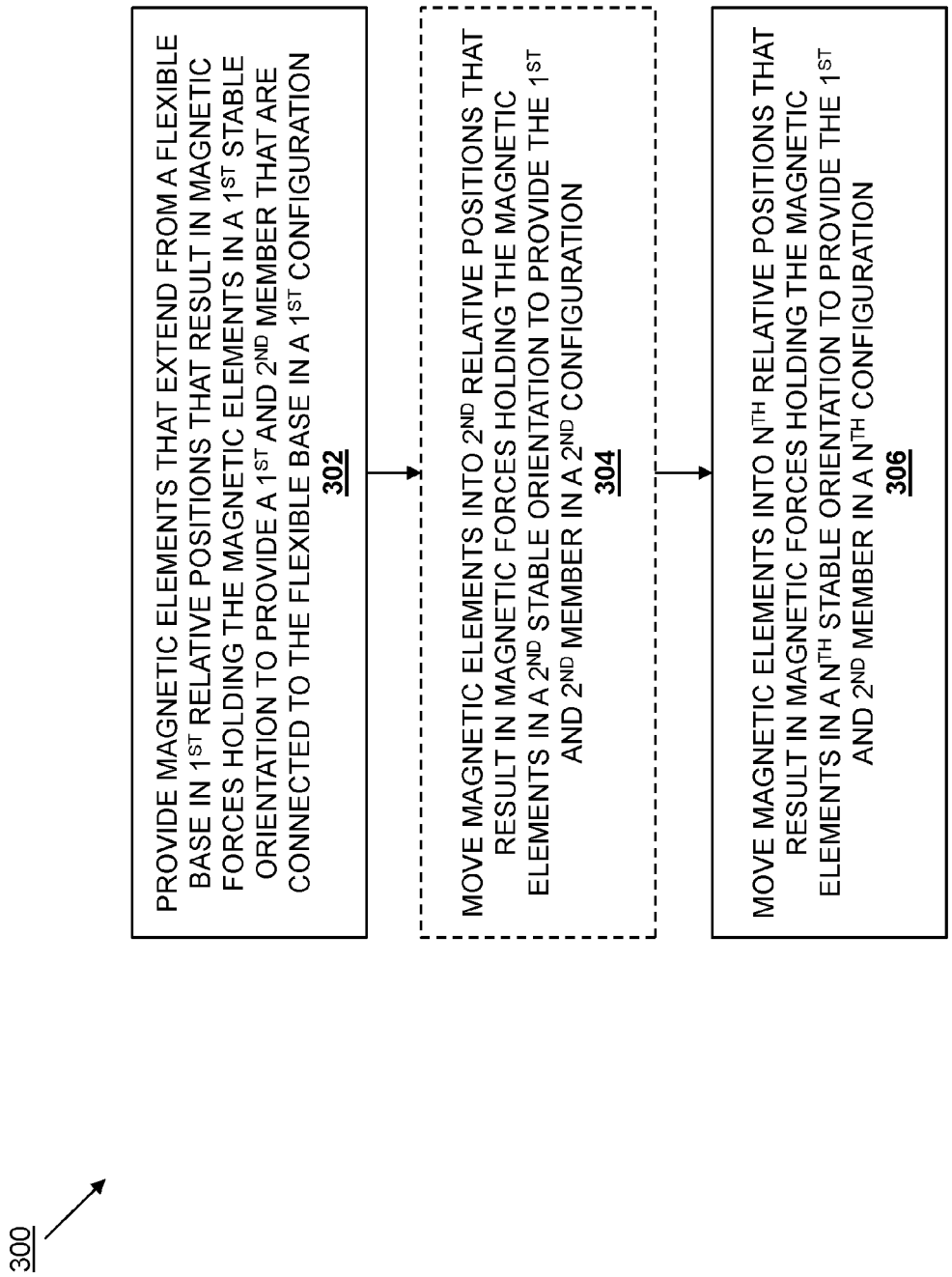
FIG. 3 is a flow chart illustrating an embodiment of a method for providing a magnetic moveable coupling system.

Referring now to FIG. 3, an embodiment of a method 300 for providing a magnetic moveable coupling system is illustrated. In the different embodiments discussed below, different magnetic hinge systems are described that each include a plurality of magnetic elements that extend from a flexible base that is connected on opposite ends to each of a first member and a second member, and the plurality of magnetic elements may be moved into different sets of relative positions that each result in the magnetic forces between them holding the plurality of magnetic elements in different stable orientations that provide the first member and the second member in different configurations. As such, the method 300 may begin at block 302 where the magnetic elements are provided in first relative positions that result in the magnetic forces between them holding the magnetic elements in a first stable orientation to provide the first member and second member in a first configuration, and then may be moved into any other available sets of relative positions that result in the magnetic forces between the magnetic elements holding the magnetic elements in other stable orientations to provide the first member and second member in other configurations at block 304 up to block 306. In each of the embodiments discussed below, the magnetic hinge systems are illustrated and discussed as being provided on the convertible laptop/notebook computing system 200 discussed above with reference to FIGS. 2A and 2B. However, the magnetic hinge systems discussed below may be provided on laptop/notebook computing systems (e.g., laptop/notebook computing systems that do not convert to tablet computing systems), flexible tablet computing systems (e.g., tablet computing systems with a flexible display that allows the tablet computing system to fold about the magnetic hinge system), and/or any other systems that would benefit from the magnetic moveable coupling discussed below.

Referring now to FIGS. 4A, 4B, 4C, 4D, 4E, and 4F, an embodiment of a magnetic hinge system 400 is illustrated. The embodiment of the magnetic hinge system 400 provides a simplified example that allows for discussion of some concepts employed in the systems and methods of the present disclosure, although as discussed below the embodiment of the magnetic hinge system 400 illustrated in FIG. 4 may be utilized with a flexible tablet computing device without much (if any) modification. While described as a "magnetic hinge system", the teachings of the present disclosure are envisioned as enabling a variety of moveable couplings other than hinges, and thus the application of the teachings of the present disclosure to those moveably couplings are envisioned as falling within the scope of the present disclosure as well. The magnetic hinge system 400 includes a flexible base 402 having a first end 402a that may be connected to a first member such as a first portion of a flexible tablet computing device, and a second end 402b that may be connected to a second member such as a second portion of a flexible tablet computing device. In such embodiments, a flexible display may extend between the first member and the second member and over the flexible base 402. A plurality of magnetic elements 404a, 404b, 404c, 404d, and up to 404e extend from the flexible base 402 in a spaced apart orientation from each other between the first end 402a and the second end 402b. One of skill in the art in possession of the present disclosure will recognize that the number of magnetic elements extending from the flexible substrate 402 may be increased or decreased from that illustrated in FIGS. 4A-E depending on the desired operation of the magnetic hinge system 400.

In an embodiment, the magnetic hinge system 400 may provide a cross sectional view of a magnetic hinge system similar to the magnetic hinge system 206 discussed above with reference to FIGS. 2A and 2B. In some of those embodiments, each of the magnetic elements 404a-e may be provided by respective spaced-apart magnetic elements that extend along the length of the magnetic hinge system 400 between the first member and the second member. However, in others of those embodiments, each of the magnetic elements 404a-e may represent one of a plurality of respective magnetic elements that are provided in a linear configuration along the length of the magnetic hinge system 400 between the first member and the second member (e.g., the magnetic element 404a is one of a plurality of first magnetic elements (that extend into and out of the Figures) that are provided in a linear configuration along the length of the magnetic hinge member 400, the magnetic element 404b is one of a plurality of second magnetic elements (that extend into and out of the Figures) that are provided in a linear configuration along the length of the magnetic hinge member 400 and adjacent the first magnetic elements, the magnetic element 404c is one of a plurality of third magnetic elements (that extend into and out of the Figures) that are provided in a linear configuration along the length of the magnetic hinge member 400 and adjacent the second magnetic elements, and so on). However, while specific embodiments of magnetic element configurations have been described, a variety of other magnetic element configurations are envisioned as falling within the scope of the present disclosure as well.

In an embodiment, each of the magnetic elements 404a-e may be provided with zones of alternating polarity that are configured such that adjacent magnetic elements are attracted to each other when separate by less than a threshold distance, and are repelled from each other when separate by more than the threshold distance. For example, such magnetic elements may be provided using programmed/correlated magnets such as POLYMAGNETS® available from Correlated Magnetics Research of New Hope, Ala., United States. Such programmed magnets may be provided by magnetic structures (e.g., ferrites, rare-earth materials, ceramics, electromagnets and/or other magnetic materials) that incorporate correlated patterns of magnets with alternating polarity (e.g., via multipole structures comprising multiple magnetic elements (maxels) of varying size, location, orientation, and saturation; via varying polarity and/or field strengths of each source of the arrays of magnetic sources that make up each structure, etc.) that are configured to provide desired behaviors. As such, the magnetic elements may be constructed from discrete permanent magnets, by exposing heated magnetizable material to a coded magnetic field, and/or using other techniques known in the art. FIG. 4F illustrates how the magnetic elements 404a and 404b may be provided by programmed magnetic structures that provide an attractive force when separated by less than radial angle 406, while providing a repelling force when separated by more than the radial angle 406. Furthermore, the programmed magnetic structures may be used to provide the magnetic elements that attract or repel with a prescribed force and engagement distance, attract or repel at certain a spatial orientation, interact only with other magnetic elements that have been coded to respond, and/or perform other programmed magnet behavior known in the art.

Figure 4A:
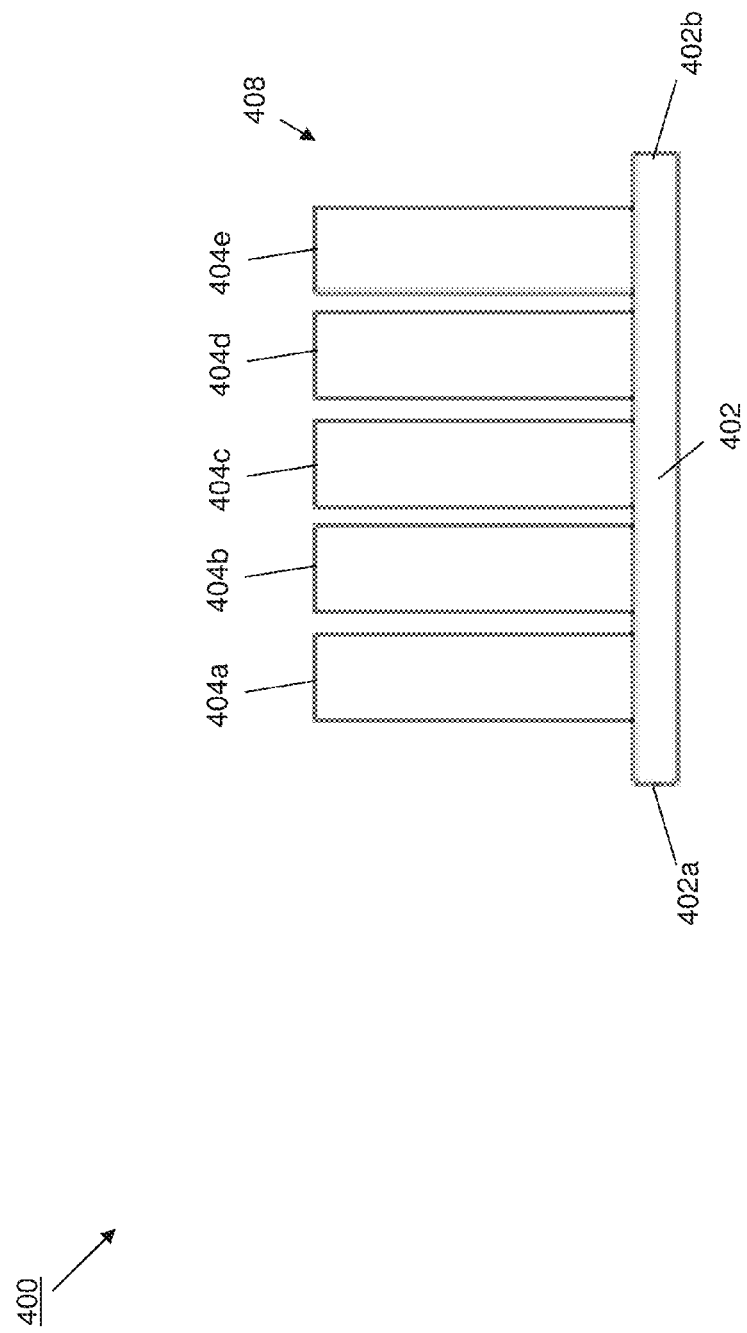
FIG. 4A is a schematic view illustrating an embodiment of a magnetic hinge system used with the computing device of FIGS. 2A and 2B.

Referring now to the embodiment illustrated in FIG. 4A, at block 302 of the method 300, the plurality of magnetic elements 404a-e are provided in first relative positions that result in magnetic forces that hold the plurality of magnetic elements in a first stable orientation 408 to provide first and second members (not illustrated) that are connected to the flexible base 402 in a first configuration. For example, the first configuration of the first and second member that is provided by the first stable orientation may be an "open" or "use" configuration for a flexible tablet computing device. In the first stable orientation, each of the magnetic elements are positioned such that they are separated by less than a radial angle threshold (e.g., the radial angle 406 discussed above with reference to FIG. 4F) and, as a result, the magnetic force between any two adjacent magnetic elements is an attractive magnetic force, and the plurality of attractive magnetic forces between the magnetic elements 404a-e provides the first stable orientation 408. One of skill in the art in possession of the present disclosure will recognize how the magnetic hinge system 400 may be provided on a flexible tablet computing device, and then manipulated to cause the magnetic elements 404a-e to "snap into" the first stable orientation 408 in order to provide the "open" or "use" configuration for a flexible tablet computing device.

Figure 4B:
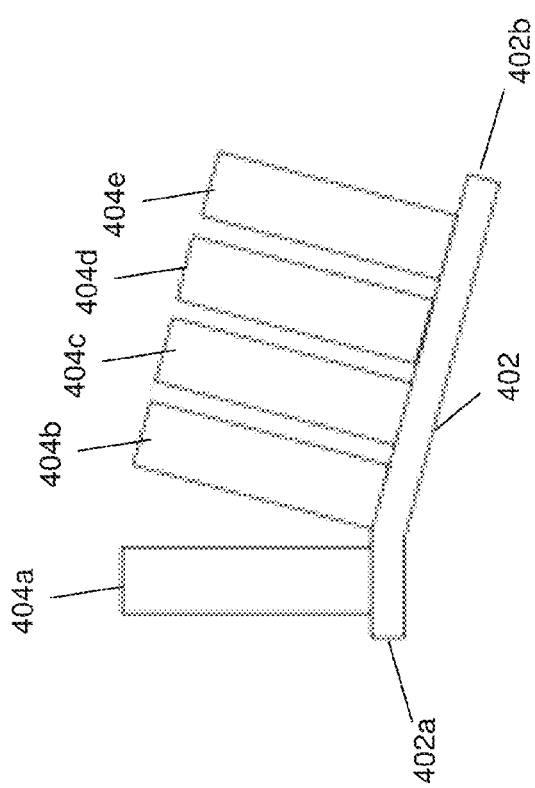
FIG. 4B is a schematic view illustrating an embodiment of the magnetic hinge system of FIG. 3A.
Figure 4C:
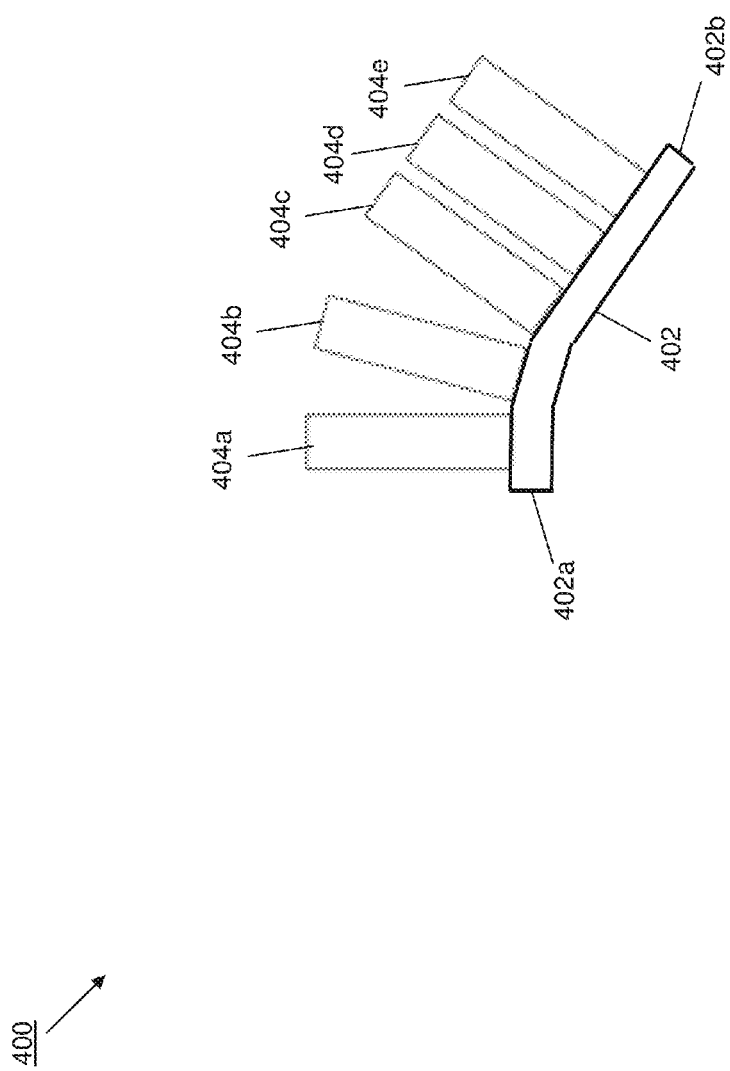
FIG. 4C is a schematic view illustrating an embodiment of the magnetic hinge system of FIG. 3A.
Figure 4D:
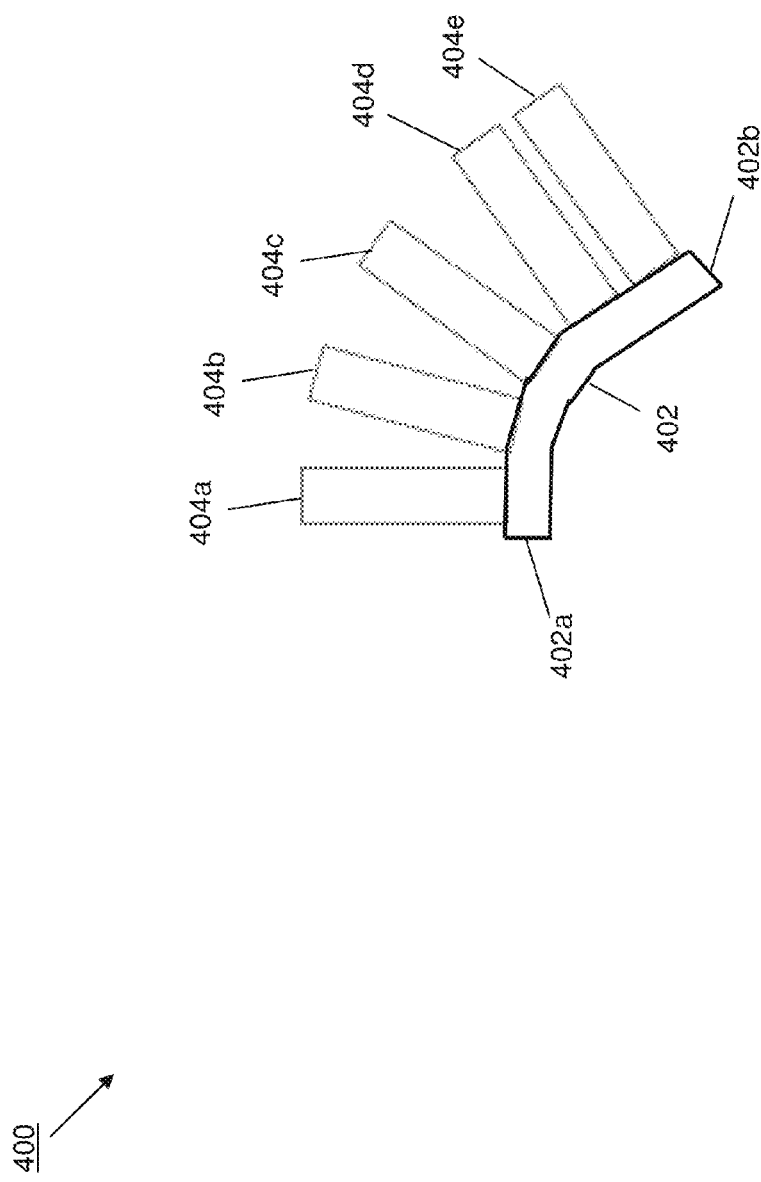
FIG. 4D is a schematic view illustrating an embodiment of the magnetic hinge system of FIG. 3A.

Referring now to FIGS. 4B-4E, at block 302 and up to block 306 of the method 300, the magnetic elements 404a-e may be moved into different relative positions (than were provided in block 302) that result in the magnetic forces between the magnetic elements 404a-e holding the magnetic elements 404a-e in a second stable orientation 410 to provide the first and second members (not illustrated) that are connected to the flexible base 402 in a second configuration. For example, the second configuration of the first and second member that is provided by the second stable orientation 410 may be a "closed" or "stored" configuration for a flexible tablet computing device that is illustrated as being provided in FIG. 4E, while the FIGS. 4B-4D illustrate intermediate relative orientations of the plurality of magnetic elements 404a-e between the first stable orientation 408 that provides the first configuration and the second stable orientation 410 that provides the second configuration. However, in other embodiments, the relative positions of the magnetic elements 404a-e illustrated in each of FIGS. 4B, 4C, and 4D may provide stable orientations of the magnetic elements 404a-e as well.

Figure 4E:
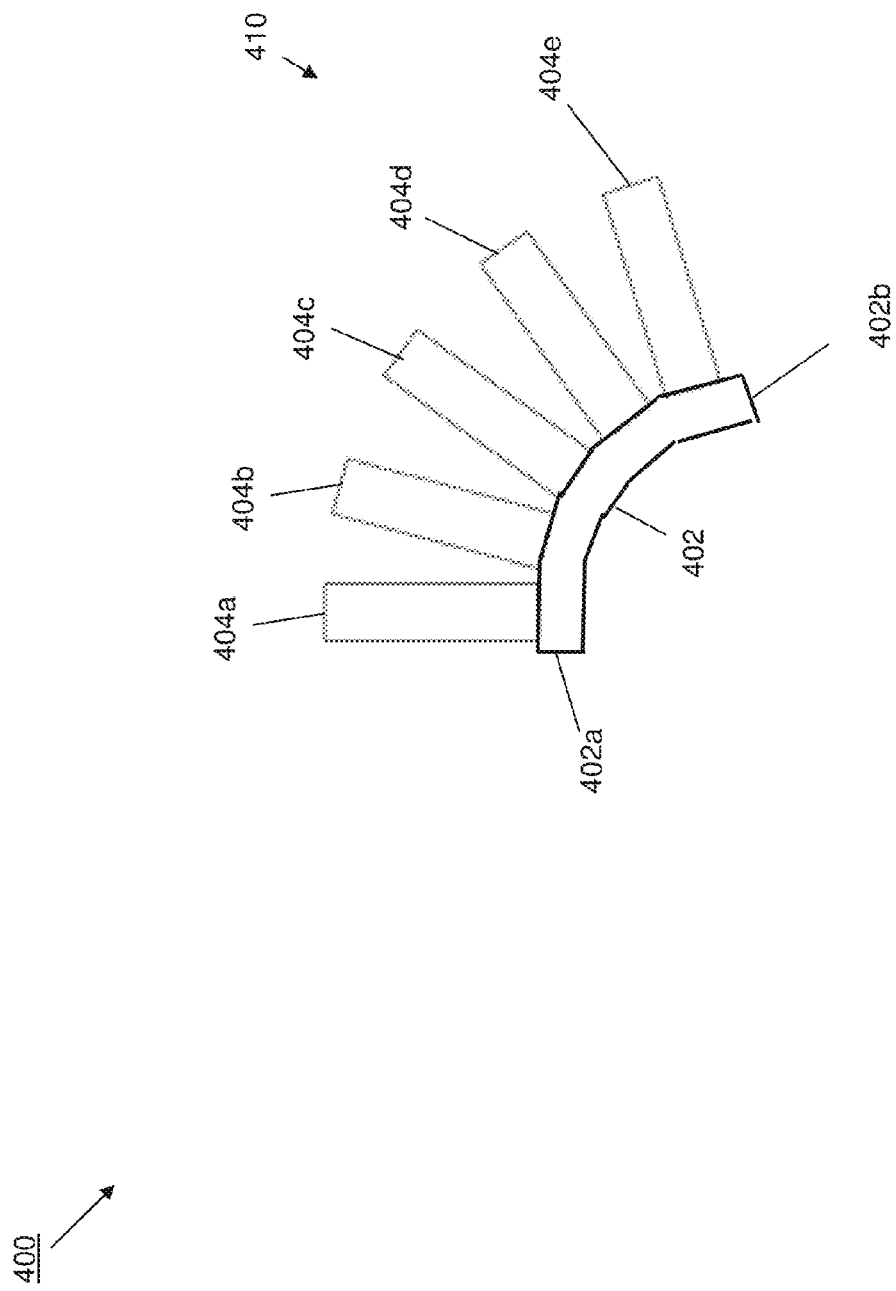
FIG. 4E is a schematic view illustrating an embodiment of the magnetic hinge system of FIG. 3A.
Figure 4F:
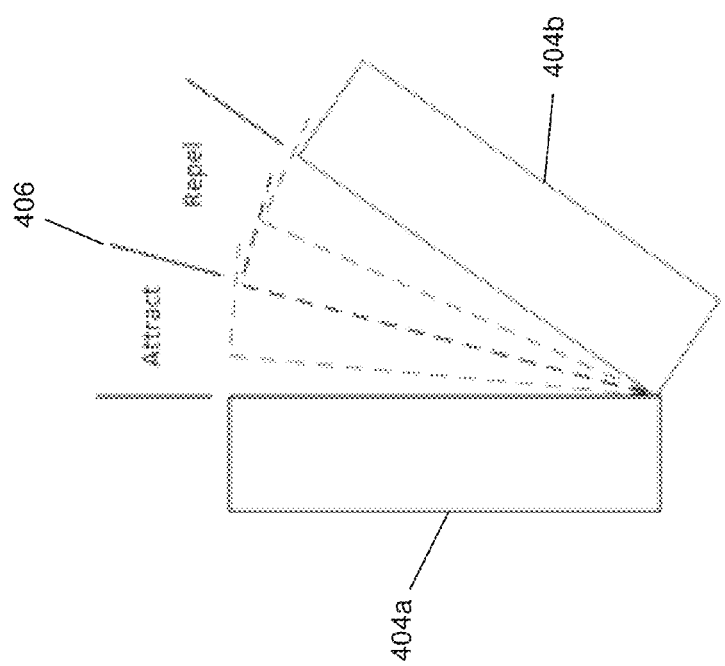
FIG. 4F is a schematic view illustrating an embodiment of the magnetic hinge system of FIG. 3A.

FIG. 4B illustrates an embodiment of the magnetic hinge system 400 with at least some of the plurality of magnetic elements 404a-e having been moved out of the first stable orientation 408 to position the magnetic elements 404a and 404b such that they are separated by more than a radial angle threshold (e.g., the radial angle 406 discussed above with reference to FIG. 4F) and, as a result, the magnetic force between the magnetic elements 404a and 404b is a repulsive force as discussed above. Similarly, FIG. 4C illustrates an embodiment of the magnetic hinge system 400 with at least some of the plurality of magnetic elements 404a-e having been moved to position the magnetic elements 404b and 404c such that they are separated by more than a radial angle threshold (e.g., the radial angle 406 discussed above with reference to FIG. 4F) and, as a result, the magnetic force between the magnetic elements 404b and 404c is a repulsive force. Similarly, FIG. 4D illustrates an embodiment of the magnetic hinge system 400 with at least some of the plurality of magnetic elements 404a-e having been moved to position the magnetic elements 404c and 404d such that they are separated by more than a radial angle threshold (e.g., the radial angle 406 discussed above with reference to FIG. 4F) and, as a result, the magnetic force between the magnetic elements 404c and 404d is a repulsive force. Similarly, FIG. 4E illustrates an embodiment of the magnetic hinge system 400 with at least some of the plurality of magnetic elements 404a-e having been moved to position the magnetic elements 404d and 404e such that they are separated by more than a radial angle threshold (e.g., the radial angle 406 discussed above with reference to FIG. 4F) and, as a result, the magnetic force between the magnetic elements 404d and 404e is a repulsive force, thus providing a repulsive force between all adjacent magnetic elements and the second stable orientation 410.

In some embodiments, the magnetic elements 404a-d may be configured such that the attractive forces between the magnetic elements 404a-e in the first stable orientation 408 are all the same. However, in other embodiments, the magnetic elements 404a-d may be configured such that the attractive forces between the magnetic elements 404a-e in the first stable orientation 408 are different. For example, the attractive force between the magnetic elements 404a and 404b ("$F_{AB}$") may be less than the attractive force between the magnetic elements 404b and 404c ("$F_{BC}$"), which may be less than the attractive force between the magnetic elements 404c and 404d ("$F_{CD}$"), which may be less than the attractive force between the magnetic elements 404d and 404e ("$F_{DE}$"). As such, the operation of the magnetic hinge member 400 may be "tuned" such that, in response to a force provided on the magnetic hinge member 400 (e.g., due to forces applied to the first and second members connected to the flexible base 402), the magnetic elements 404a and 404b are the first to transition from the attractive force to the repelling force as illustrated in FIG. 4B, the magnetic elements 404b and 404c are the second to transition from the attractive force to the repelling force as illustrated in FIG. 4C, the magnetic elements 404c and 404d are the third to transition from the attractive force to the repelling force as illustrated in FIG. 4D, and the magnetic elements 404d and 404e are the fourth to transition from the attractive force to the repelling force as illustrated in FIG. 4E. Similarly, the magnetic elements 404a-d may be configured such that the repulsive forces between the magnetic elements 404a-e in the second stable orientation 410 are different in order to provide a desired magnetic hinge system functionality, and one of skill in the art in possession of the present disclosure will recognize that different attractive and magnetic force configurations (e.g., other than the $F_{AB}<F_{BC}<F_{CD}<F_{DE}$ configuration discussed above) to provide any particular magnetic hinge system functionality will fall within the scope of the present disclosure as well.

Figure 5:
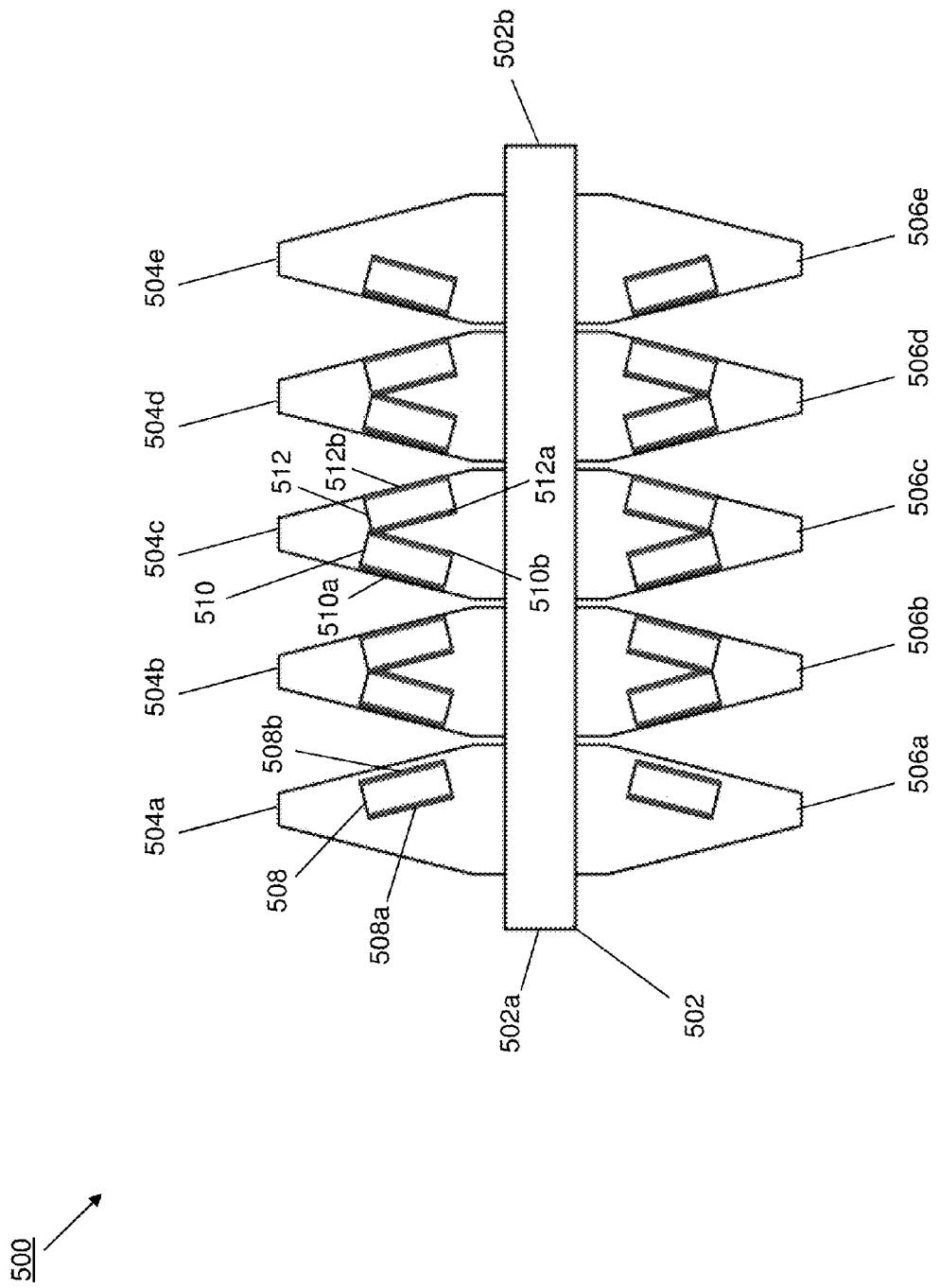
FIG. 5 is a schematic view illustrating an embodiment of a magnetic hinge system.

Referring now to FIG. 5, an embodiment of a magnetic hinge system 500 is illustrated. The embodiment of the magnetic hinge system 500 is illustrated and described below to provide an example of the use of conventional magnets (as opposed to the programmed magnets discussed above) according to the teachings of the present disclosure to provide a magnetic hinge system on a convertible laptop/tablet computing device. As discussed above, while described as a "magnetic hinge system", the teachings of the present disclosure are envisioned as enabling a variety of moveable couplings other than hinges, and thus the application of the teachings of the present disclosure to those moveably couplings are envisioned as falling within the scope of the present disclosure as well. Furthermore, while illustrated and described as utilizing conventional magnets, other types of magnets (e.g., the programmed magnets discussed above) may be provided in magnetic hinge systems similar to that illustrated in FIG. 5, and/or in combination with conventional magnets, to provide a variety of desired behavior that would be apparent to one of skill in the art in possession of the present disclosure.

The magnetic hinge system 500 includes a flexible base 502 having a first end 502a that may be connected to a first member such as the base member 202 of the computing device 200 of FIGS. 2A and 2B, and a second end 502b that may be connected to a second member such as the display member 204 of the computing device 200. A first subset a plurality of magnetic elements 504a, 504b, 504c, 504d, and up to 504e extend from a top side of the flexible base 502 in a spaced apart orientation from each other between the first end 502a and the second end 502b, and a second subset a plurality of magnetic elements 506a, 506b, 506c, 506d, and up to 506e extend from a bottom side of the flexible base 502 in a spaced apart orientation from each other between the first end 502a and the second end 502b, where the top side and the bottom side are opposite each other on the flexible base 502. One of skill in the art in possession of the present disclosure will recognize that the number of magnetic elements extending from the flexible substrate 502 may be increased or decreased depending on the desired operation of the magnetic hinge system 500.

In an embodiment, the magnetic hinge system 500 may provide a cross sectional view of the magnetic hinge system 206 discussed above with reference to FIGS. 2A and 2B. In some of those embodiments, each of the magnetic elements 504a-e and 506a-e may be provided by respective spaced-apart magnetic elements that extend along the length of the magnetic hinge system 500 between the base member 202 and the display member 204. However, in others of those embodiments, each of the magnetic elements 504a-e and 506a-e may represent one of a plurality of respective magnetic elements that are provided in a linear configuration along the length of the magnetic hinge system 500 between the base member 202 and the display member 204 (e.g., the magnetic element 504a is one of a plurality of first magnetic elements (that extend into and out of the Figures) that are provided in a linear configuration along the length of the magnetic hinge member 500, the magnetic element 504b is one of a plurality of second magnetic elements (that extend into and out of the Figures) that are provided in a linear configuration along the length of the magnetic hinge member 500 and adjacent the first magnetic elements, the magnetic element 504c is one of a plurality of third magnetic elements (that extend into and out of the Figures) that are provided in a linear configuration along the length of the magnetic hinge member 500 and adjacent the second magnetic elements, and so on). However, while specific embodiments of magnetic element configurations have been described, a variety of other magnetic element configurations are envisioned as falling within the scope of the present disclosure as well.

Each of the magnetic elements 504a-e and 506a-e may include at least one magnet that is configured to interact with at least one other magnet in another of the plurality of magnetic elements in order to provide the functionality discussed below. In the illustrated embodiment, the magnetic elements 504a, 504e, 506a, and 506e are each illustrated as including a single magnet. For example, the magnetic element 504a includes a magnet 508 having a first section 508a providing a magnetic field and a second section 508b providing a magnetic field. In the illustrated embodiment, the magnetic elements 504b-d and 506b-d are each illustrated as including a pair of magnets. For example, the magnetic element 504c includes a first magnet 510 having a first section 510a providing a magnetic field and a second section 510b providing a magnetic field, and a second magnet 512 having a first section 512a providing a magnetic field and a second section 520b providing a magnetic field. As can be seen in the example of FIG. 5 and as is described below, the magnets in the magnetic elements 504a-e and 506a-e may be configured such that the magnetic fields provided by the sections of those magnets are aligned to attract each other when positioned within a threshold distance from each other. For example, the magnetic field provided by the section 508b of the magnet 508 in the magnetic element 504a may be configured to produce an attractive force with the magnetic field provided by a section of the immediately adjacent magnet included in the magnetic element 504b (e.g., the magnet on left side of the magnetic element 504b in FIG. 5). Similarly, the magnetic field provided by the section of the magnet on right side of the magnetic element 504b in FIG. 5 may be configured to produce an attractive force with the magnetic field provided by the section 510a of the immediately adjacent magnet 510 included in the magnetic element 504c, and so on. As described below, the configuration of the magnets in the magnetic elements 504a-e and 506a-e allows the attractive forces in those magnetics to produce multiple stable orientations of the magnetic elements to provide the base member 202 and the display member 204 on the computing device 200 in multiple configurations.

Figure 6B:
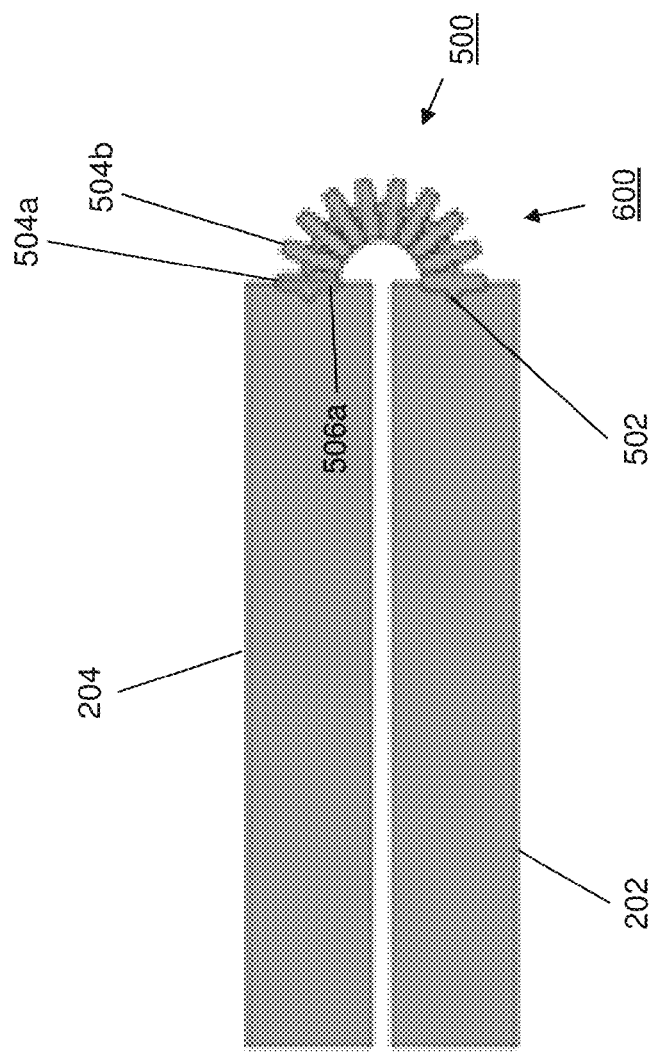
FIG. 6B is a schematic view illustrating an embodiment of the convertible laptop/tablet computing system of FIG. 6A in the first orientation using the magnetic hinge system of FIG. 5.

Referring now to the embodiment illustrated in FIGS. 6A and 6B, at block 302 of the method 300, the plurality of magnetic elements 504a-e and 506a-e are provided in first relative positions that result in magnetic forces that hold the plurality of magnetic elements in a first stable orientation 600 to provide the base member 202 and the display member 204 that are connected to the flexible base 502 in a first configuration. For example, the first configuration of the base member 202 and the display member 204 that is provided by the first stable orientation 600 may be a "closed" or "stored" configuration for a convertible laptop/tablet computing device (also illustrated in FIG. 2A). In the first stable orientation 600, each of the first subset of the plurality of magnetic elements 504a-e are positioned such that they are separated by less than a radial angle threshold and, as a result, an attractive magnetic force between any two adjacent magnetic elements 504a-e causes those adjacent magnetic elements 504a-e to engage, while adjacent magnetic elements of the second subset of the plurality of magnetic elements 506a-e are kept sufficient radial angle from each other such that they do not engage due to the magnetic forces between them, as illustrated in FIGS. 6A and 6B. One of skill in the art in possession of the present disclosure will recognize how the magnetic hinge system 500 may be provided on a convertible laptop/tablet computing device, and then manipulated to cause the magnetic elements 504a-e to "snap into" the first stable orientation 600 in order to provide the "closed" or "storage" configuration for a convertible laptop/tablet computing device.

Figure 6C:
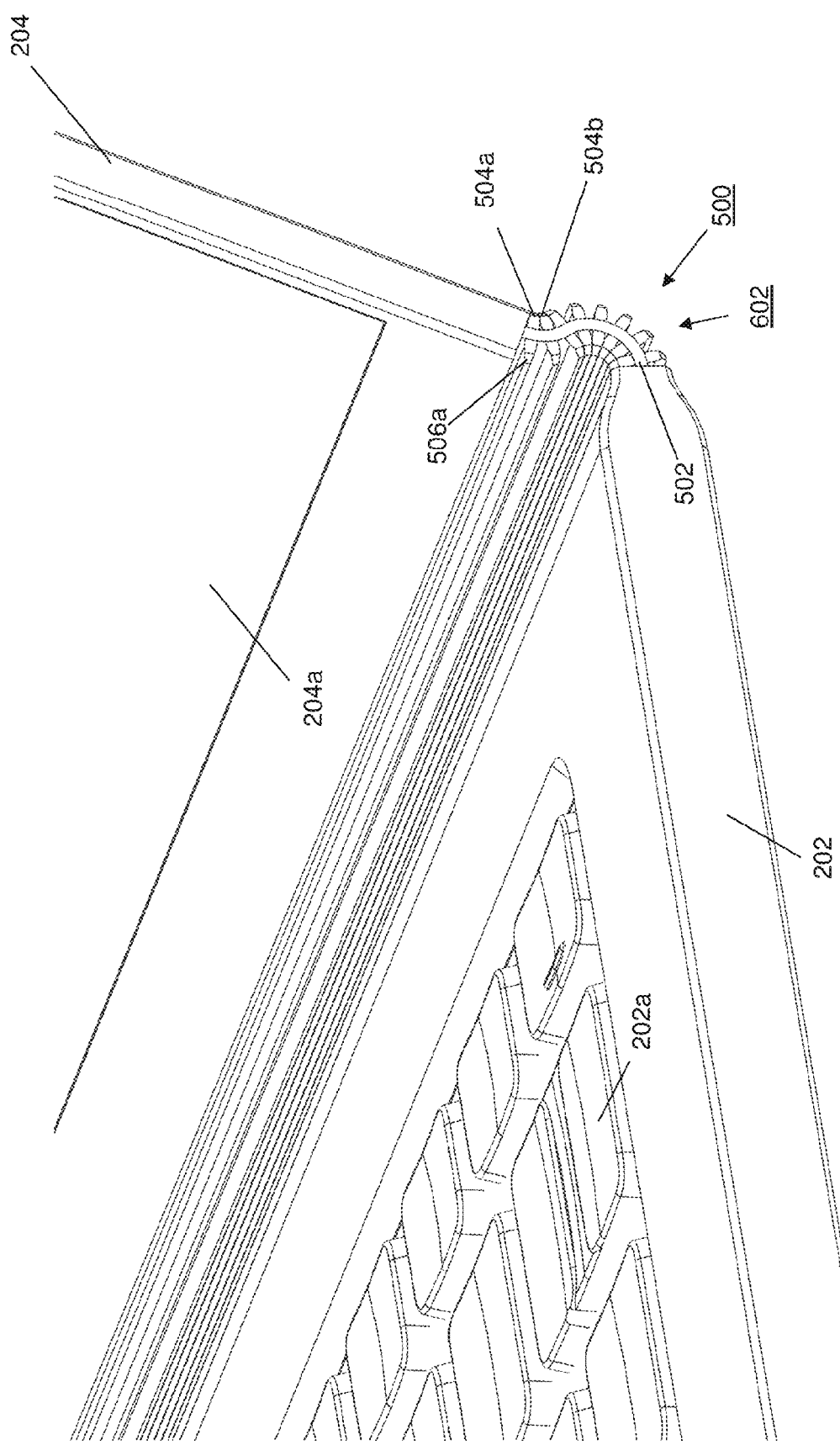
FIG. 6C is a perspective view illustrating an embodiment of the convertible laptop/tablet computing system of FIG. 6A in a second orientation using the magnetic hinge system of FIG. 5.
Figure 6D:
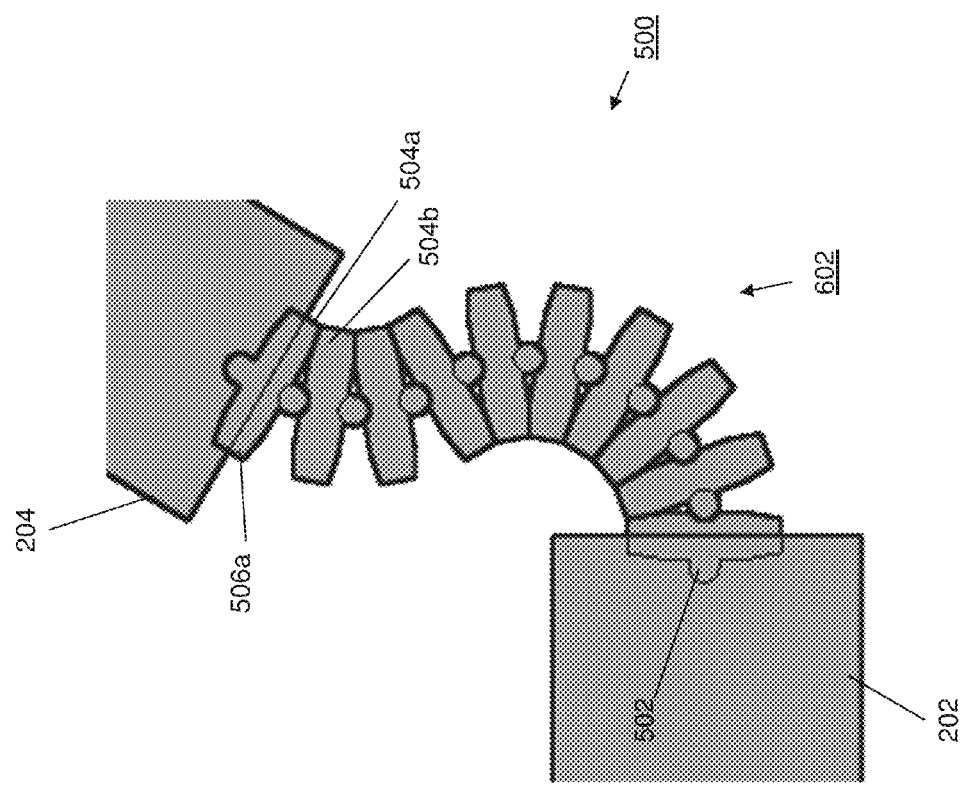
FIG. 6D is a schematic view illustrating an embodiment of the convertible laptop/tablet computing system of FIG. 6C in the second orientation using the magnetic hinge system of FIG. 5.
Figure 6E:
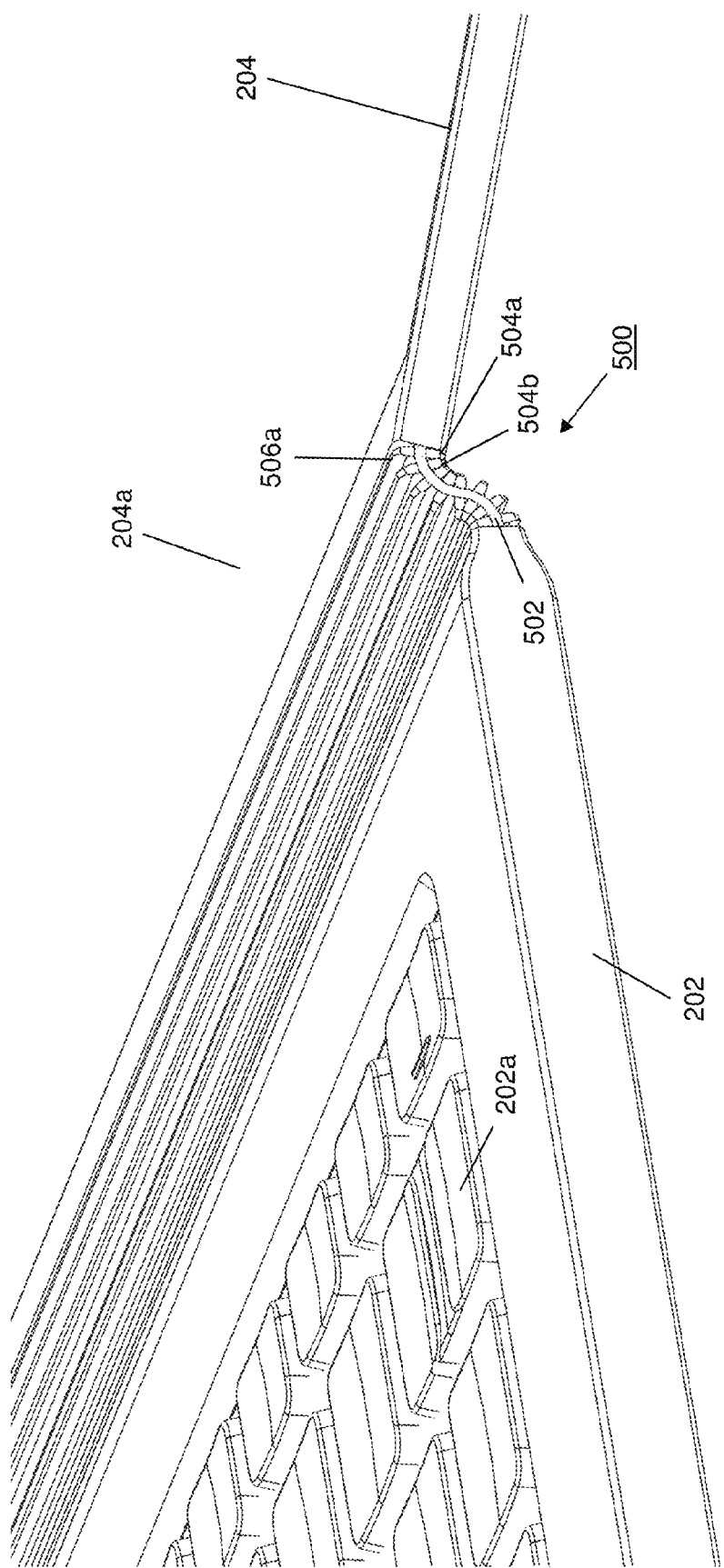
FIG. 6E is a perspective view illustrating an embodiment of the convertible laptop/tablet computing system of FIG. 6A in a third orientation using the magnetic hinge system of FIG. 5.
Figure 6F:
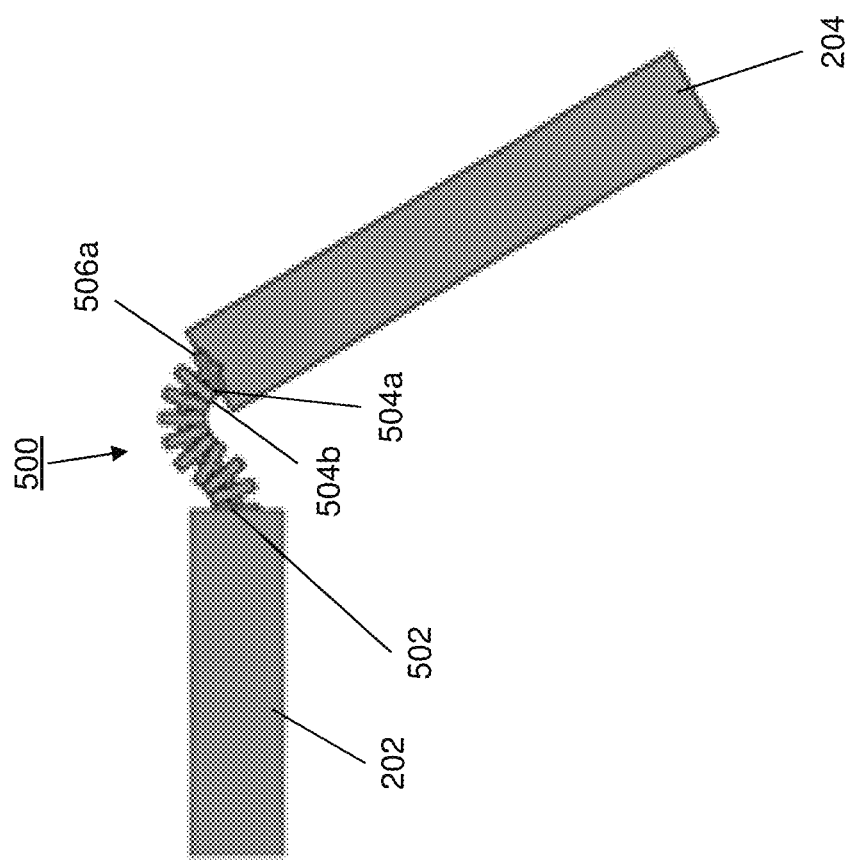
FIG. 6F is a schematic view illustrating an embodiment of the convertible laptop/tablet computing system of FIG. 6E in the third orientation using the magnetic hinge system of FIG. 5.
Figure 6G:
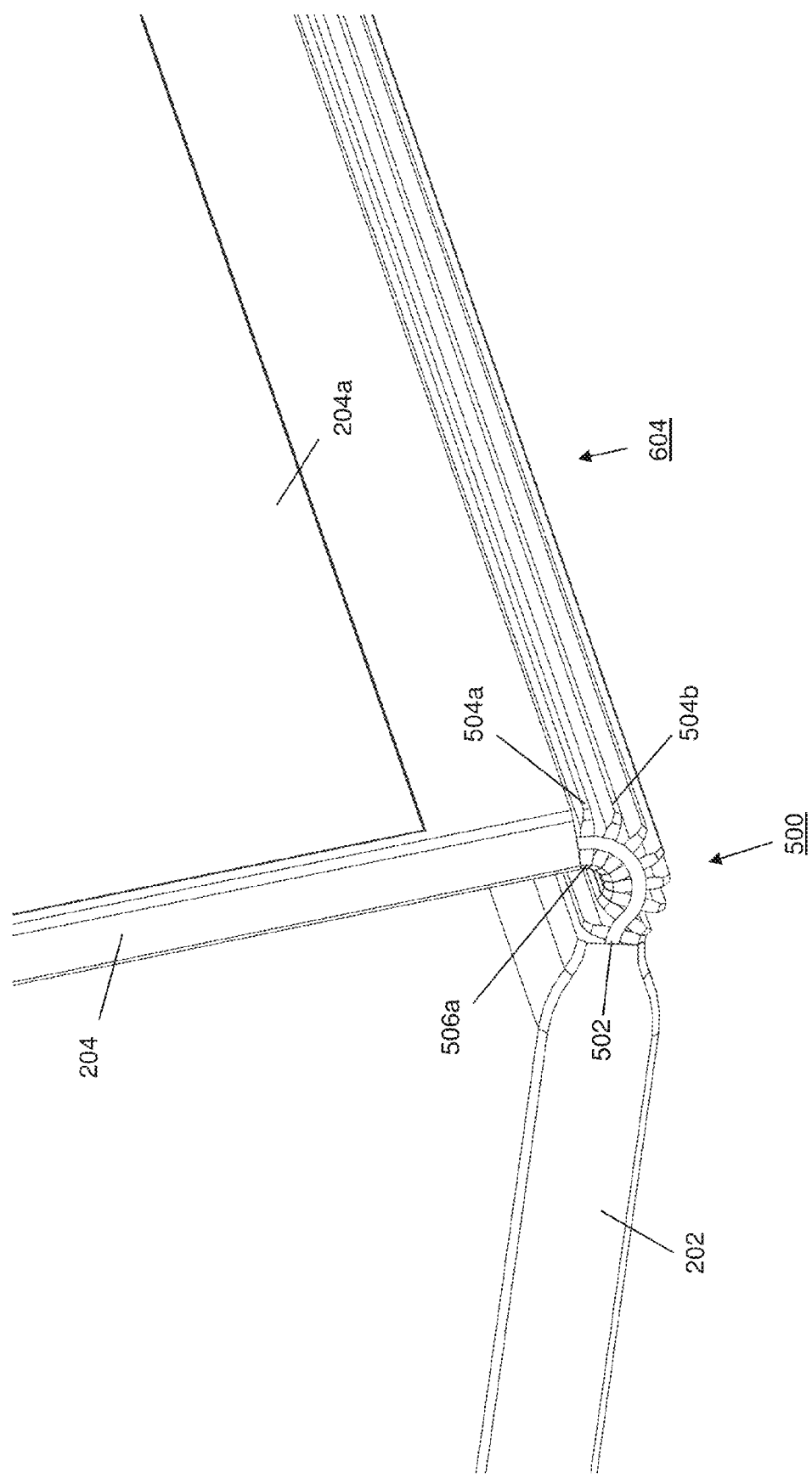
FIG. 6G is a perspective view illustrating an embodiment of the convertible laptop/tablet computing system of FIG. 6A in a fourth orientation using the magnetic hinge system of FIG. 5.
Figure 6H:
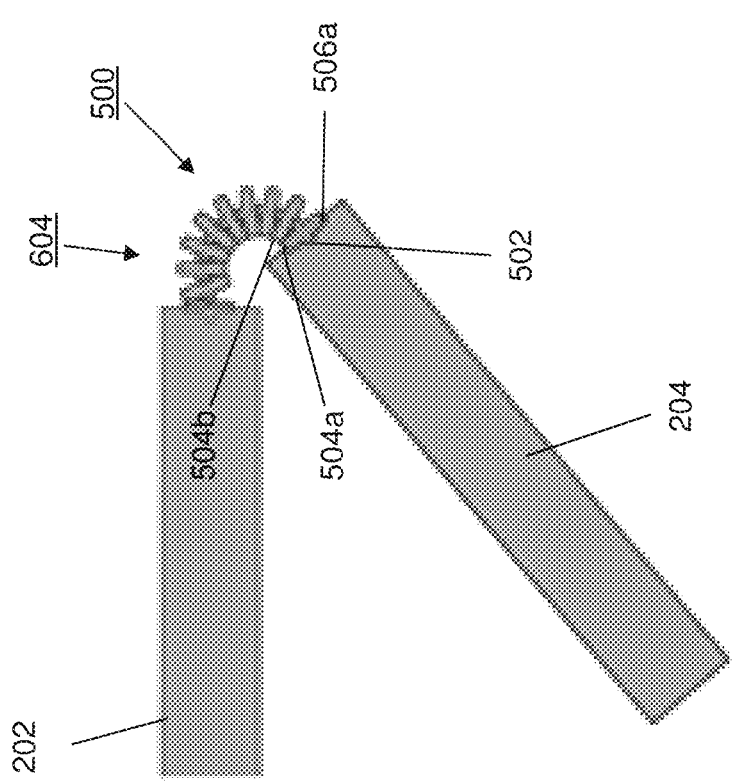
FIG. 6H is a schematic view illustrating an embodiment of the convertible laptop/tablet computing system of FIG. 6G in the fourth orientation using the magnetic hinge system of FIG. 5.

Referring now to FIGS. 6C-6I, at block 304 and up to block 306 of the method 300, the magnetic elements 504a-e and 506a-e may be moved into different relative positions (than were provided in block 302) that result in the magnetic forces between the magnetic elements 504a-e and 506a-e holding the magnetic elements 504a-e and 506a-e in other stable orientations to provide the base member 202 and the display member 204 that are connected to the flexible base 502 in other configurations. For example, FIGS. 6C and 6D illustrate a second configuration of the base member 202 and the display member 204 that is provided by a second stable orientation 602 of the magnetic elements 504a-e and 506a-e and that may be a "laptop/notebook" configuration for a convertible laptop/tablet computing device. The second stable orientation 602 may be provided by moving the magnetic elements 504a-e and 506a-e (e.g., from their relative positions in the first stable orientation 600) into the relative positions illustrated in FIGS. 6C and 6D in which some of the first subset of the plurality of magnetic elements 504a-e are positioned such that they are separated by less than a radial angle threshold and, as a result, an attractive magnetic force between those adjacent magnetic elements 504a-e causes those adjacent magnetic elements 504a-e to engage; some of the second subset of the plurality of magnetic elements 506a-e are positioned such that they are separated by less than a radial angle threshold and, as a result, an attractive magnetic force between those adjacent magnetic elements 506a-e causes those adjacent magnetic elements 504a-e to engage, while remaining adjacent magnetic elements of the first subset and the second subset of the plurality of magnetic elements are kept sufficient radial angle from each other such that they do not engage due to the magnetic forces between them, as illustrated in FIGS. 6C and 6D.

FIGS. 6E-6H illustrate movement of the base member 202 and the display member 204 from second stable orientation 602 of the magnetic elements 504a-e and 506a-e and into a third stable orientation 604 for a convertible laptop/tablet computing device. The third stable orientation 602 may be provided by first moving the magnetic elements 504a-e and 506a-e (e.g., from their relative positions in the second stable orientation 602) into the relative positions illustrated in FIGS. 6E and 6F, and then moving the magnetic elements 504a-e and 506a-e (e.g., from their relative positions illustrated in FIGS. 6E and 6F) into the relative positions illustrated in FIGS. 6G and 6H in which some of the first subset of the plurality of magnetic elements 504a-e are positioned such that they are separated by less than a radial angle threshold and, as a result, an attractive magnetic force between those adjacent magnetic elements 504a-e causes those adjacent magnetic elements 504a-e to engage; some of the second subset of the plurality of magnetic elements 506a-e are positioned such that they are separated by less than a radial angle threshold and, as a result, an attractive magnetic force between those adjacent magnetic elements 506a-e causes those adjacent magnetic elements 504a-e to engage, while remaining adjacent magnetic elements of the first subset and the second subset of the plurality of magnetic elements are kept sufficient radial angle from each other such that they do not engage due to the magnetic forces between them.

Figure 6I:
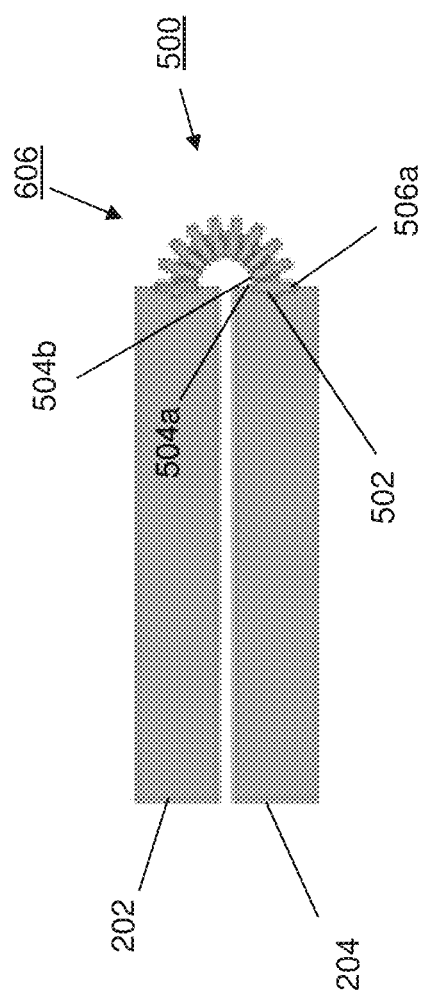
FIG. 6I is a schematic view illustrating an embodiment of the convertible laptop/tablet computing system of FIG. 6G in a fifth orientation using the magnetic hinge system of FIG. 5.

FIG. 6I illustrates movement of the base member 202 and the display member 204 from the third stable orientation 604 of the magnetic elements 504a-e and 506a-e and into a fourth stable orientation 606 for a convertible laptop/tablet computing device that may be a "tablet" configuration. The fourth stable orientation 606 may be provided by moving the magnetic elements 504a-e and 506a-e (e.g., from their relative positions in the third stable orientation 604) into the relative positions illustrated in FIG. 6I in which the second subset of the plurality of magnetic elements 506a-e are positioned such that they are separated by less than a radial angle threshold and, as a result, an attractive magnetic force between those adjacent magnetic elements 506a-e causes those adjacent magnetic elements 506a-e to engage, while the first subset of the plurality of magnetic elements 504a-e are kept a sufficient radial angle from each other such that they do not engage due to the magnetic forces between them.

In some embodiments, the magnetic elements 504a-d and 506a-d may be configured such that the attractive forces between them in the different stable orientations are all the same. However, in other embodiments, the magnetic elements 504a-d and 506a-d may be configured such that the attractive forces between them in different stable orientations are different. For example, the attractive force between the magnetic elements 504a and 504b may be less than the attractive force between the magnetic elements 504b and 504c, which may be less than the attractive force between the magnetic elements 504c and 504d, which may be less than the attractive force between the magnetic elements 504d and 504e. Similarly, the attractive force between the magnetic elements 506a and 506b may be less than the attractive force between the magnetic elements 506b and 506c, which may be less than the attractive force between the magnetic elements 506c and 506d, which may be less than the attractive force between the magnetic elements 506d and 506e. As such, the operation of the magnetic hinge member 500 may be "tuned" such that, in response to a force provided on the magnetic hinge member 500 (e.g., due to forces applied to the base member 202 and display member 204 connected to the flexible base 502), the magnetic elements 504a and 504b are the first to break their attractive force, the magnetic elements 504b and 405c are the second to break their attractive force, the magnetic elements 504c and 504d are the third to break their attractive force, as so on. One of skill in the art in possession of the present disclosure will recognize that different magnetic force configurations to provide any particular magnetic hinge system functionality will fall within the scope of the present disclosure as well.

Figure 7:
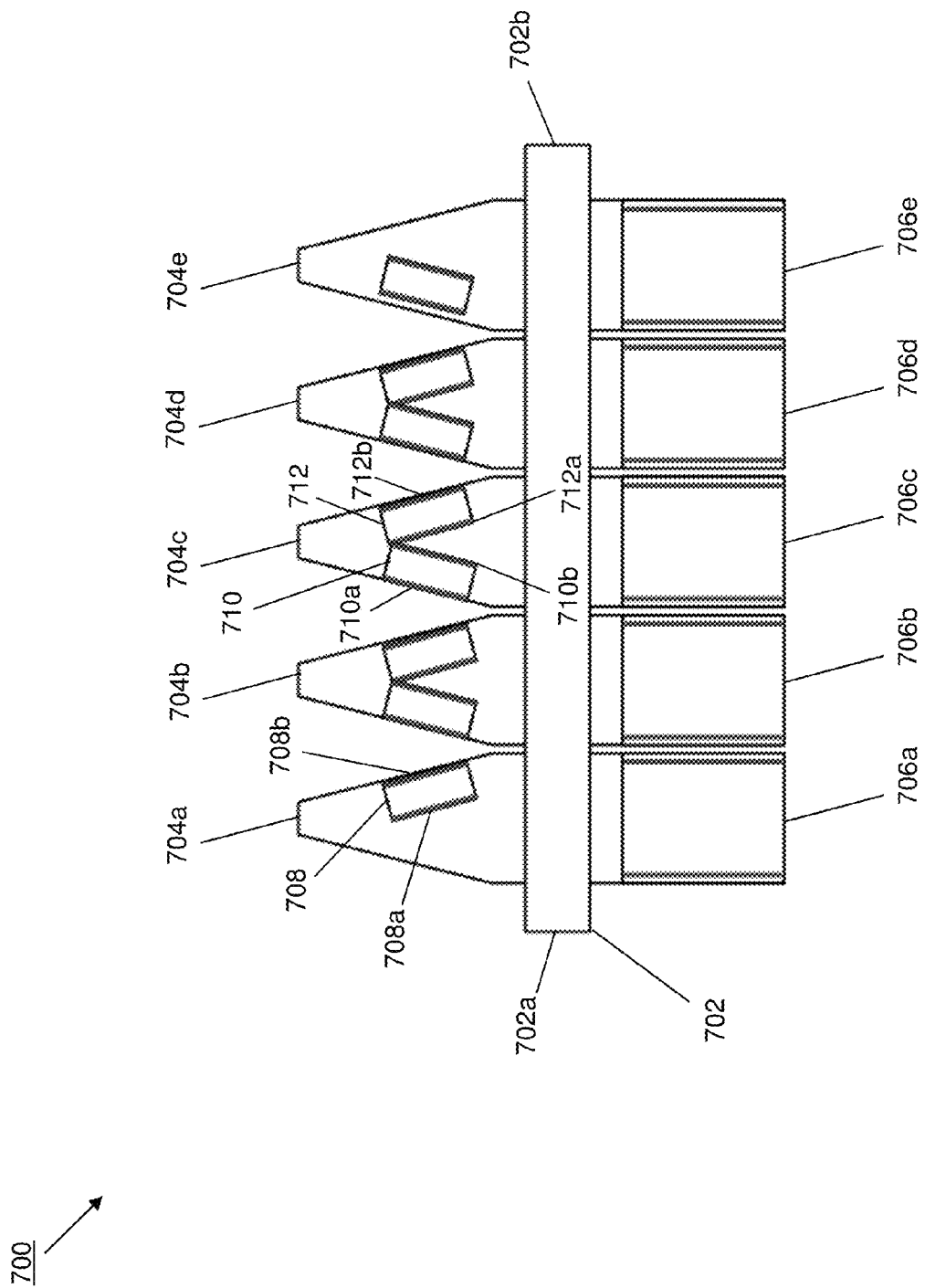
FIG. 7 is a schematic view illustrating an embodiment of a magnetic hinge system.

Referring now to FIG. 7, an embodiment of a magnetic hinge system 700 is illustrated. The magnetic hinge system 700 is provided as an example of magnetic elements structures that may be used to define the hinging functionality and range of motion of the magnetic hinge system 700. As discussed above, while described as a "magnetic hinge system", the teachings of the present disclosure are envisioned as enabling a variety of moveable couplings other than hinges, and thus the application of the teachings of the present disclosure to those moveably couplings are envisioned as falling within the scope of the present disclosure as well. Furthermore, while illustrated and described as utilizing conventional magnets, other types of magnets (e.g., the programmed magnets discussed above) may be provided in magnetic hinge systems similar to that illustrated in FIG. 6, and/or in combination with conventional magnets, to provide a variety of desired behavior that would be apparent to one of skill in the art in possession of the present disclosure.

Similarly to the magnetic hinge system 500 discussed above with reference to FIGS. 5 and 6A-6I, the magnetic hinge system 700 includes a flexible base 702 having a first end 702a and a second end 702b, as well as a first subset a plurality of magnetic elements 704a, 704b, 704c, 704d, and up to 704e that extend from a top side of the flexible base 702 in a spaced apart orientation from each other between the first end 702a and the second end 702b, and a second subset a plurality of magnetic elements 706a, 706b, 706c, 706d, and up to 706e that extend from a bottom side of the flexible base 702 in a spaced apart orientation from each other between the first end 702a and the second end 702b. However, as can be seen in FIG. 7, the dimensions of the first subset of the plurality of magnetic elements 704a-e are different from the dimensions of the second subset of magnetic elements 706a-e, and as described below, provide limits on the movement of the magnetic hinge system 700 and the subsequent configurations of the first and second members connected to the magnetic hinge system 700. One of skill in the art in possession of the present disclosure will recognize that the number of magnetic elements extending from the flexible substrate 702 may be increased or decreased depending on the desired operation of the magnetic hinge system 700.

In an embodiment, the magnetic hinge system 700 may provide a cross sectional view of the magnetic hinge system 206 discussed above with reference to FIGS. 2A and 2B. In some of those embodiments, each of the magnetic elements 704a-e and 706a-e may be provided by respective spaced-apart magnetic elements that extend along the length of the magnetic hinge system 700 between the base member 202 and the display member 204. However, in others of those embodiments, each of the magnetic elements 704a-e and 706a-e may represent one of a plurality of respective magnetic elements that are provided in a linear configuration along the length of the magnetic hinge system 700 between the base member 202 and the display member 204 (e.g., the magnetic element 704a is one of a plurality of first magnetic elements (that extend into and out of the Figures) that are provided in a linear configuration along the length of the magnetic hinge member 700, the magnetic element 704b is one of a plurality of second magnetic elements (that extend into and out of the Figures) that are provided in a linear configuration along the length of the magnetic hinge member 700 and adjacent the first magnetic elements, the magnetic element 704c is one of a plurality of third magnetic elements (that extend into and out of the Figures) that are provided in a linear configuration along the length of the magnetic hinge member 700 and adjacent the second magnetic elements, and so on). However, while specific embodiments of magnetic element configurations have been described, a variety of other magnetic element configurations are envisioned as falling within the scope of the present disclosure as well.

Each of the magnetic elements 704a-e and 706a-e may include at least one magnet that is configured to interact with at least one other magnet in another of the plurality of magnetic elements in order to provide the functionality discussed below. In the illustrated embodiment, the magnetic elements 704a, 704e, and 706a-e each include a single magnet. For example, the magnetic element 704a includes a magnet 708 having a first section 708a providing a magnetic field and a second section 708b providing a magnetic field. In the illustrated embodiment, the magnetic elements 704b-d each include a pair of magnets. For example, the magnetic element 704c includes a first magnet 710 having a first section 710a providing a magnetic field and a second section 710b providing a magnetic field, and a second magnet 712 having a first section 712a providing a magnetic field and a second section 712b providing a magnetic field. As can be seen in the example of FIG. 7 and as is described below, the magnets in the magnetic elements 704a-e and 706a-e may be configured such that the magnetic fields provided by the sections of those magnets are aligned to attract each other when positioned within a threshold distance from each other. For example, the magnetic field provided by the section 708b of the magnet 708 in the magnetic element 704a may be configured to produce an attractive force with the magnetic field provided by a section of the immediately adjacent magnet included in the magnetic element 704b (e.g., the magnet on left side of the magnetic element 704b in FIG. 7). Similarly, the magnetic field provided by the section of the magnet on right side of the magnetic element 704b in FIG. 7 may be configured to produce an attractive force with the magnetic field provided by the section 710a of the immediately adjacent magnet 710 included in the magnetic element 704c, and so on. As described below, the configuration of the magnets in the magnetic elements 704a-e and 706a-e allows the attractive forces in those magnets to produce multiple stable orientations of the magnetic elements to provide the base member 202 and the display member 204 on the computing device 200 in multiple configurations.

Figure 8A:
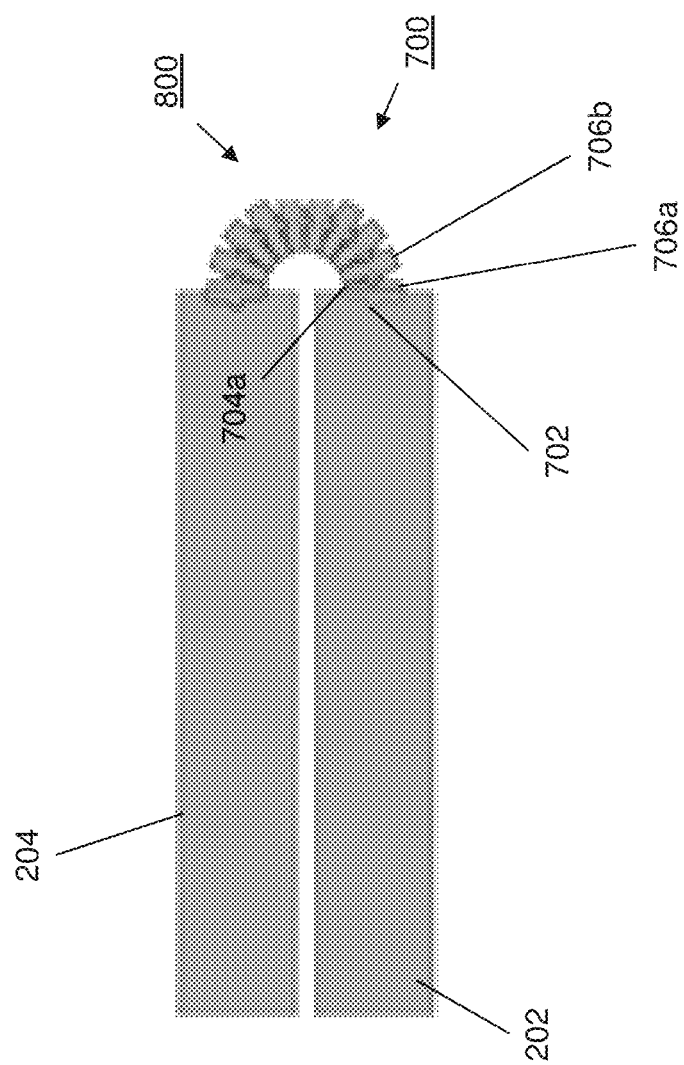
FIG. 8A is a schematic view illustrating an embodiment of a flexible tablet computing system in a first orientation using the magnetic hinge system of FIG. 5.
Figure 8B:
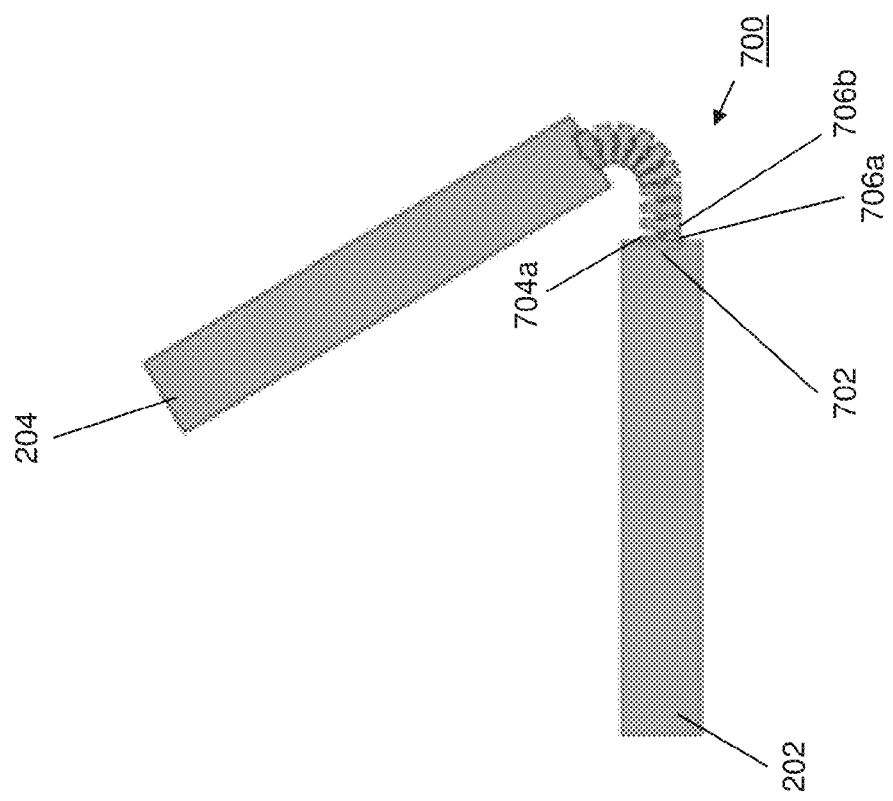
FIG. 8B is a schematic view illustrating an embodiment of the flexible tablet computing system of FIG. 8A in a second orientation using the magnetic hinge system of FIG. 5.

Referring now to the embodiment illustrated in FIG. 8A, at block 302 of the method 300, the plurality of magnetic elements 704a-e and 706a-e are provided in first relative positions that result in magnetic forces that hold the plurality of magnetic elements in a first stable orientation 800 to provide the base member 202 and the display member 204 that are connected to the flexible base 702 in a first configuration. For example, the first configuration of the base member 202 and the display member 204 that is provided by the first stable orientation 800 may be a "closed" or "stored" configuration for a flexible tablet computing device. In the first stable orientation 800, each of the first subset of the plurality of magnetic elements 704a-e are positioned such that they are separated by less than a radial angle threshold and, as a result, an attractive magnetic force between any two adjacent magnetic elements 704a-e causes those adjacent magnetic elements 704a-e to engage, while adjacent magnetic elements of the second subset of the plurality of magnetic elements 706a-e are kept sufficient radial angle from each other such that they do not engage due to the magnetic forces between them, as illustrated in FIG. 8A. One of skill in the art in possession of the present disclosure will recognize how the magnetic hinge system 700 may be provided on a flexible tablet computing device, and then manipulated to cause the magnetic elements 704a-e to "snap into" the first stable orientation 800 in order to provide the "closed" or "storage" configuration for a flexible tablet computing device.

Referring now to FIGS. 8B-8E, at block 304 and up to block 306 of the method 300, the magnetic elements 704a-e and 706a-e may be moved into different relative positions (than were provided in block 302) that result in the magnetic forces between the magnetic elements 704a-e and 706a-e holding the magnetic elements 704a-e and 706a-e in other stable orientations to provide the base member 202 and the display member 204 that are connected to the flexible base 702 in other configurations. For example, FIGS. 8B-8E illustrate movement of the base member 202 and the display member 204 into a second configuration that is provided by a second stable orientation 802 of the magnetic elements 704a-e and 706a-e and that may be an "open" configuration for a flexible tablet computing device. The second stable orientation 802 may be provided by moving the magnetic elements 704a-e and 706a-e (e.g., from their relative positions in the first stable orientation 800) into the relative positions illustrated in FIGS. 6B-6D in which some of the first subset of the plurality of magnetic elements 704a-e are positioned such that they are separated by less than a radial angle threshold and, as a result, an attractive magnetic force between those adjacent magnetic elements 704a-e causes those adjacent magnetic elements 504a-e to engage; some of the second subset of the plurality of magnetic elements 706a-e are positioned such that they are separated by less than a radial angle threshold and, as a result, an attractive magnetic force between those adjacent magnetic elements 706a-e causes those adjacent magnetic elements 704a-e to engage, while remaining adjacent magnetic elements of the first subset and the second subset of the plurality of magnetic elements are kept sufficient radial angle from each other such that they do not engage due to the magnetic forces between them.

Figure 8C:
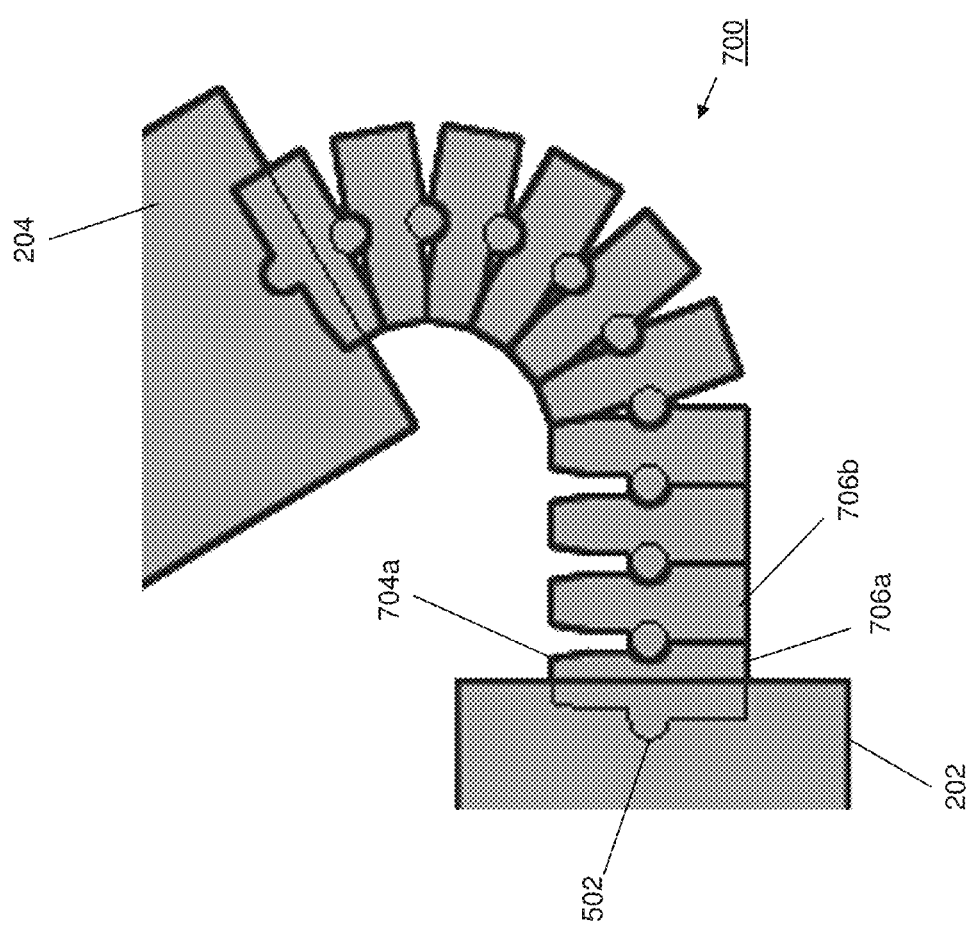
FIG. 8C is a schematic view illustrating an embodiment of the flexible tablet computing system of FIG. 8A in the second orientation using the magnetic hinge system of FIG. 5.
Figure 8D:
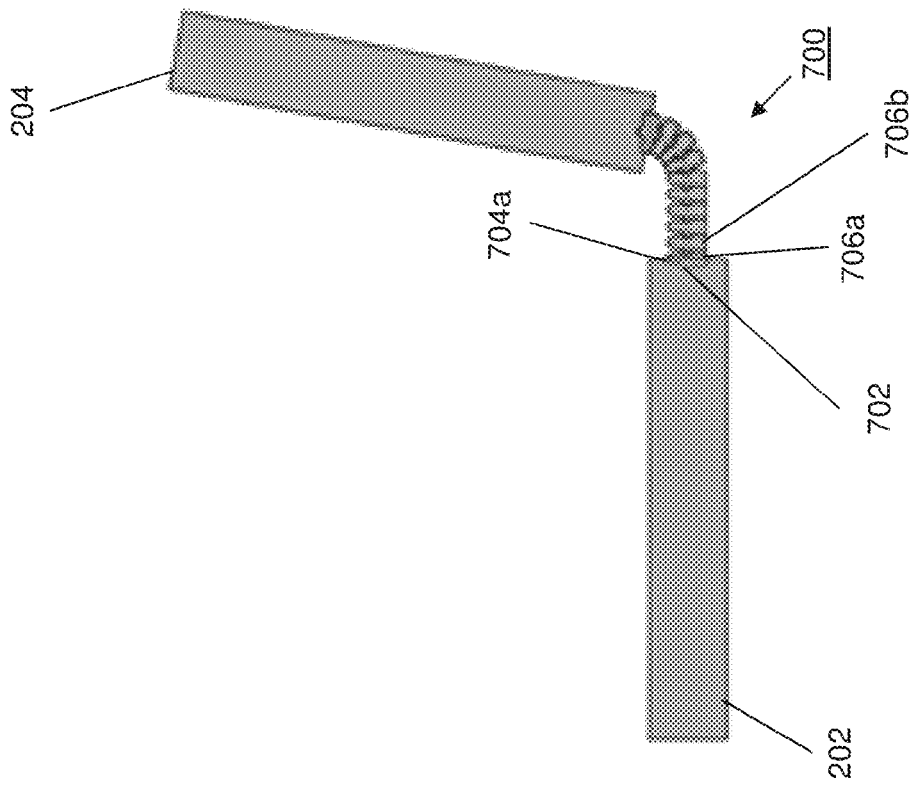
FIG. 8D is a schematic view illustrating an embodiment of the flexible tablet computing system of FIG. 6C in a third orientation using the magnetic hinge system of FIG. 5.
Figure 8E:
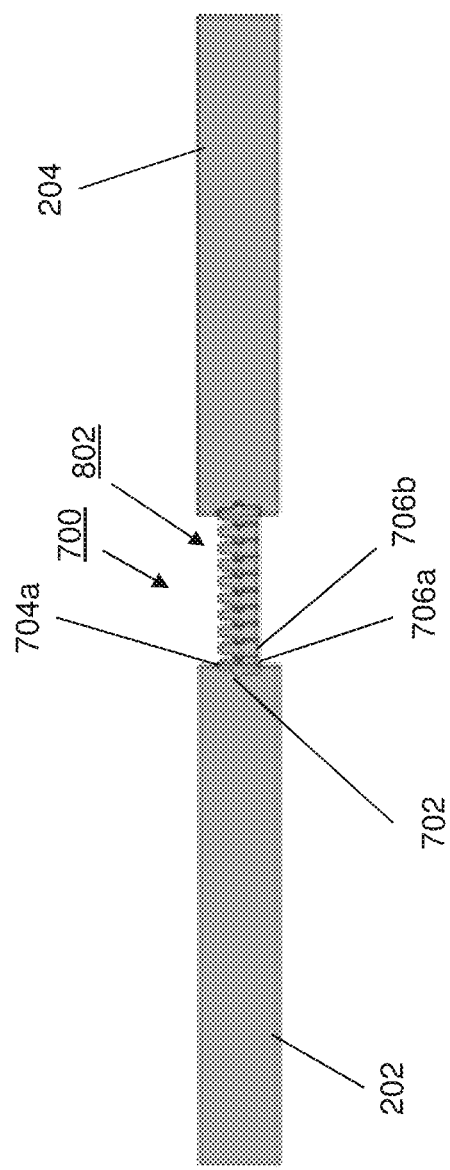
FIG. 8E is a schematic view illustrating an embodiment of the flexible tablet computing system of FIG. 8A in a fourth orientation using the magnetic hinge system of FIG. 5.

FIG. 8E illustrates the base member 202 and the display member 204 in the second configuration due to the second stable orientation 802 of the magnetic elements 704a-e and 706a-e, and as can be seen in FIG. 8C, is enabled (at least in part) by the structure of the second subset of magnetic elements 706a-e that results in engagement of those magnetic elements 706a-e to prevent further rotation via the magnetic hinge system 700. In some embodiments, the magnetic elements 704a-d and 706a-d may be configured such that the attractive forces between them in the different stable orientations are all the same. However, in other embodiments, the magnetic elements 704a-d and 706a-d may be configured such that the attractive forces between them in different stable orientations are different. For example, the attractive force between the magnetic elements 704a and 704b may be less than the attractive force between the magnetic elements 704b and 704c, which may be less than the attractive force between the magnetic elements 704c and 704d, which may be less than the attractive force between the magnetic elements 704d and 704e. Similarly, the attractive force between the magnetic elements 706a and 706b may be less than the attractive force between the magnetic elements 706b and 706c, which may be less than the attractive force between the magnetic elements 706c and 706d, which may be less than the attractive force between the magnetic elements 706d and 706e. As such, the operation of the magnetic hinge system 700 may be "tuned" such that, in response to a force provided on the magnetic hinge system 700 (e.g., due to forces applied to the base member 202 and display member 204 connected to the flexible base 702), the magnetic elements 704a and 704b are the first to break their attractive force, the magnetic elements 704b and 704c are the second to break their attractive force, the magnetic elements 704c and 704d are the third to break their attractive force, as so on. One of skill in the art in possession of the present disclosure will recognize that different magnetic force configurations to provide any particular magnetic hinge system functionality will fall within the scope of the present disclosure as well.

Thus, systems and methods have been described that provide for a magnetic moveable coupling that uses magnetic forces provided by magnetic elements to allow for movement into different system configurations, and tunes those magnetic forces to provide different stable orientations of the magnetic elements to allow for multiple different configurations provided via those magnetic forces. The use of the magnetic elements and their magnetic forces to provide the moveable coupling reduces the need to depend on friction to allow for different system configurations, thus providing a moveable coupling that is less prone to wear and failure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A magnetic hinge system, comprising:
   a first member;
   a second member; and
   a hinge moveably coupling the first member to the second member, wherein the hinge includes:
      a flexible base connected to each of the first member and the second member; and
      a plurality of magnetic elements extending from the flexible base;
      wherein the plurality of magnetic elements are configured to be moved into first relative positions that result in the magnetic forces between the plurality of magnetic elements holding the plurality of magnetic elements in a first stable orientation to provide the first member and the second member in a first configuration; and
      wherein the plurality of magnetic elements are configured to be moved into second relative positions that result in the magnetic forces between the plurality of magnetic elements holding the plurality of magnetic elements in a second stable orientation to provide the first member and the second member in a second configuration that is different than the first configuration.

2. The system of claim 1, wherein the plurality of magnetic elements include a first subset of the plurality of magnetic elements that extend from a first side of the flexible base, and a second subset of the plurality of magnetic elements that extend from a second side of the flexible base that is opposite the flexible base from the first side.

3. The system of claim 2, wherein the magnetic forces between the first subset of the plurality of magnetic elements are configured to cause each of the first subset of the plurality of magnetic elements to engage at least one of the other magnetic elements in the first subset of the plurality of magnetic elements when moved into the first relative positions in order to provide the first stable orientation, and wherein the magnetic forces between the second subset of the plurality of magnetic elements are configured to cause each of the second subset of the plurality of magnetic elements to engage at least one of the other magnetic elements in the second subset of the plurality of magnetic elements when moved into the second relative positions in order to provide the second stable orientation.

4. The system of claim 1, wherein at least a subset of the plurality of magnetic elements include different polarity zones such that the magnetic forces between each of the subset of the plurality of magnetic elements and at least one of the other magnetic elements in the plurality of magnetic elements provides an attractive magnetic force when separated by less than a first distance and a repelling magnetic force when separated by more than the first distance.

5. The system of claim 4, wherein the attractive magnetic forces and the repelling magnetic forces between each of the subset of the plurality of magnetic elements and at least one of the other magnetic elements in the plurality of magnetic elements holds the plurality of magnetic elements in a third stable orientation to provide the first member and the second member in a third configuration that is different than the first configuration and the second configuration.

6. The system of claim 1, wherein the plurality of magnetic elements are configured such that first magnetic forces between a first subset of at least two of the plurality of magnetic elements is greater than second magnetic forces between a second subset of at least two of the plurality of magnetic elements.

7. The system of claim 1, wherein the movement of the plurality of magnetic elements into the second relative positions rotates the first member relative to the second member from the first configuration and into the second configuration, and wherein at least a subset of the plurality of magnetic elements are configured to engage each other when moved into the second relative positions in order to prevent further rotation of the first member relative to the second member.

8. An information handling system (IHS), comprising:
   a base member housing a processing system and a memory system;
   a display member housing a display device; and
   a hinge moveably coupling the base member to the display member, wherein the hinge includes:
      a flexible base connected to each of the base member and the display member; and
      a plurality of magnetic elements extending from the flexible base;
      wherein the plurality of magnetic elements are configured to be moved into first relative positions that result in the magnetic forces between the plurality of magnetic elements holding the plurality of magnetic elements in a first stable orientation to provide the base member and the display member in a first configuration; and wherein the plurality of magnetic elements are configured to be moved into second relative positions that result in the magnetic forces between the plurality of magnetic elements holding the plurality of magnetic elements in a second stable orientation to provide the base member and the display member in a second configuration that is different than the first configuration.

9. The IHS of claim 8, wherein the plurality of magnetic elements include a first subset of the plurality of magnetic elements that extend from a first side of the flexible base, and a second subset of the plurality of magnetic elements that extend from a second side of the flexible base that is opposite the flexible base from the first side.

10. The IHS of claim 9, wherein the magnetic forces between the first subset of the plurality of magnetic elements are configured to cause each of the first subset of the plurality of magnetic elements to engage at least one of the other magnetic elements in the first subset of the plurality of magnetic elements when moved into the first relative positions in order to provide the first stable orientation, and wherein the magnetic forces between the second subset of the plurality of magnetic elements are configured to cause each of the second subset of the plurality of magnetic elements to engage at least one of the other magnetic elements in the second subset of the plurality of magnetic elements when moved into the second relative positions in order to provide the second stable orientation.

11. The IHS of claim 8, wherein at least a subset of the plurality of magnetic elements include different polarity zones such that the magnetic forces between each of the subset of the plurality of magnetic elements and at least one of the other magnetic elements in the plurality of magnetic elements provides an attractive magnetic force when separated by less than a first distance and a repelling magnetic force when separated by more than the first distance.

12. The IHS of claim 11, wherein the attractive magnetic forces and the repelling magnetic forces between each of the subset of the plurality of magnetic elements and at least one of the other magnetic elements in the plurality of magnetic elements holds the plurality of magnetic elements in a third stable orientation to provide the base member and the display member in a third configuration that is different than the first configuration and the second configuration.

13. The IHS of claim 8, wherein the plurality of magnetic elements are configured such that first magnetic forces between a first subset of at least two of the plurality of magnetic elements is greater than second magnetic forces between a second subset of at least two of the plurality of magnetic elements.

14. The IHS of claim 8, wherein the movement of the plurality of magnetic elements into the second relative positions rotates the base member relative to the display member from the first configuration and into the second configuration, and wherein at least a subset of the plurality of magnetic elements are configured to engage each other when moved into the second relative positions in order to prevent further rotation of the base member relative to the display member.

15. A method for providing hinge movement, comprising:
providing a plurality of magnetic elements that extend from a flexible base in first relative positions that result in the magnetic forces between the plurality of magnetic elements holding the plurality of magnetic elements in a first stable orientation to provide a first member and a second member that are connected to the flexible base in a first configuration; and moving the plurality of magnetic elements into second relative positions that result in the magnetic forces between the plurality of magnetic elements holding the plurality of magnetic elements in a second stable orientation to provide the first member and the second member in a second configuration that is different than the first configuration.

16. The method of claim 15, wherein the plurality of magnetic elements include a first subset of the plurality of magnetic elements that extend from a first side of the flexible base, and a second subset of the plurality of magnetic elements that extend from a second side of the flexible base that is opposite the flexible base from the first side.

17. The method of claim 16, wherein the magnetic forces between the first subset of the plurality of magnetic elements cause each of the first subset of the plurality of magnetic elements to engage at least one of the other magnetic elements in the first subset of the plurality of magnetic elements when moved into the first relative positions in order to provide the first stable orientation, and wherein the magnetic forces between the second subset of the plurality of magnetic elements cause each of the second subset of the plurality of magnetic elements to engage at least one of the other magnetic elements in the second subset of the plurality of magnetic elements when moved into the second relative positions in order to provide the second stable orientation.

18. The method of claim 15, wherein at least a subset of the plurality of magnetic elements include different polarity zones such that the magnetic forces between each of the subset of the plurality of magnetic elements and at least one of the other magnetic elements in the plurality of magnetic elements provides an attractive magnetic force when separated by less than a first distance and a repelling magnetic force when separated by more than the first distance.

19. The method of claim 18, further comprising:
moving the plurality of magnetic elements into third relative positions that result in the attractive magnetic forces and the repelling magnetic forces between each of the subset of the plurality of magnetic elements and at least one of the other magnetic elements in the plurality of magnetic elements holds the plurality of magnetic elements in a third stable orientation to provide the first member and the second member in a third configuration that is different than the first configuration and the second configuration.

20. The method of claim 15, wherein first magnetic forces between a first subset of at least two of the plurality of magnetic elements is greater than second magnetic forces between a second subset of at least two of the plurality of magnetic elements.

* * * * *